(12) United States Patent
Holmes et al.

(10) Patent No.: US 10,549,569 B2
(45) Date of Patent: Feb. 4, 2020

(54) SECURITY DEVICE AND METHOD OF MANUFACTURE

(71) Applicant: DE LA RUE INTERNATIONAL LIMITED, Hampshire (GB)

(72) Inventors: Brian William Holmes, Hampshire (GB); Lawrence George Commander, Reading (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 50 days.

(21) Appl. No.: 15/552,732

(22) PCT Filed: Mar. 10, 2016

(86) PCT No.: PCT/GB2016/050657
§ 371 (c)(1),
(2) Date: Aug. 22, 2017

(87) PCT Pub. No.: WO2016/151284
PCT Pub. Date: Sep. 29, 2016

(65) Prior Publication Data
US 2018/0065396 A1    Mar. 8, 2018

(30) Foreign Application Priority Data

Mar. 23, 2015   (GB) .................................. 1504838.2

(51) Int. Cl.
*B42D 25/29* (2014.01)
*G02B 3/00* (2006.01)
(Continued)

(52) U.S. Cl.
CPC .............. *B42D 25/29* (2014.10); *B41M 3/14* (2013.01); *B42D 25/30* (2014.10); *G02B 3/005* (2013.01);
(Continued)

(58) Field of Classification Search
CPC .. B42D 25/29; B42D 25/342; G02B 27/2214; G02B 3/005
See application file for complete search history.

(56) References Cited

U.S. PATENT DOCUMENTS 4,892,336 A   1/1990 Kaule et al.
6,373,637 B1 * 4/2002 Gulick, Jr. ......... G02B 27/2264
                                                353/32
(Continued)

FOREIGN PATENT DOCUMENTS

EP           0059056 A1    9/1982
EP           0059056 B1    5/1985
(Continued)

OTHER PUBLICATIONS

Mar. 14, 2017 International Preliminary Report on Patentability issued in International Patent Application No. PCT/GB2016/050657.

(Continued)

*Primary Examiner* — David R Dunn
*Assistant Examiner* — Christopher E Veraa
(74) *Attorney, Agent, or Firm* — Oliff PLC

(57) ABSTRACT

A security device includes: an elongate focusing structures array, the elongate axes are aligned along a first-direction, the elongate focusing structures parallel to one another periodically along a second-direction is orthogonally to the first-direction, each elongate focusing structure having an optical footprint of different elongate strips will be directed to the viewer in dependence on the viewing angle, the centre line of each optical footprint parallel with the first-direction; image elements-array overlapping the array of elongate focusing structures, the image elements-array representing elongate image slices of at least two respective images, each image slice including one or more image elements, and at least one image slice of each respective image in the optical (Continued)

footprint of each elongate focusing structure. The image elements-array is configured so the distance in the second-direction of each image slice from the centre line of an optical footprint in the image slice changes along the first-direction.

35 Claims, 20 Drawing Sheets

(51) Int. Cl.
  G02B 27/22 (2018.01)
  B42D 25/30 (2014.01)
  B41M 3/14 (2006.01)
(52) U.S. Cl.
  CPC ....... *G02B 3/0037* (2013.01); *G02B 27/2214* (2013.01)

(56) References Cited

U.S. PATENT DOCUMENTS

| | | | |
|---|---|---|---|
| 6,856,462 | B1 | 2/2005 | Scarbrough et al. |
| 2002/0030360 | A1 | 3/2002 | Herrmann et al. |
| 2006/0003295 | A1* | 1/2006 | Hersch ................. B42D 25/342 434/110 |
| 2009/0052026 | A1* | 2/2009 | Takagi ............... G02B 27/2214 359/463 |
| 2009/0324104 | A1* | 12/2009 | Cheung ................. G02B 27/60 382/224 |
| 2011/0233918 | A1* | 9/2011 | Lundvall ............. G02B 3/0056 283/70 |
| 2012/0268598 | A1* | 10/2012 | Holmes .............. G02B 27/2214 348/143 |
| 2013/0163078 | A1* | 6/2013 | Saito .................... H04N 13/305 359/466 |
| 2014/0285884 | A1 | 9/2014 | Raymond et al. |
| 2014/0312606 | A1* | 10/2014 | Lister ..................... B41M 3/148 283/85 |
| 2015/0151562 | A1* | 6/2015 | Whiteman ........... B42D 25/342 283/85 |
| 2015/0343829 | A1* | 12/2015 | Hatton ................... B42D 25/29 428/30 |
| 2016/0086066 | A1* | 3/2016 | Porras Soto ........... G03B 35/24 358/1.6 |
| 2017/0246900 | A1* | 8/2017 | Cote .................... G02B 3/0056 |

FOREIGN PATENT DOCUMENTS

| | | |
|---|---|---|
| EP | 0723501 B1 | 7/1997 |
| EP | 0860298 A2 | 8/1998 |
| EP | 1398174 A1 | 3/2004 |
| EP | 2460667 A2 | 6/2012 |
| JP | 2014-205260 A | 10/2014 |
| WO | 83/00659 A1 | 3/1983 |
| WO | 94/27254 A1 | 11/1994 |
| WO | 95/10419 A1 | 4/1995 |
| WO | 00/039391 A1 | 7/2000 |
| WO | 03/054297 A2 | 7/2003 |
| WO | 03/095188 A2 | 11/2003 |
| WO | 2005/052650 A2 | 6/2005 |
| WO | 2005/106601 A2 | 11/2005 |
| WO | 2005/115119 A2 | 12/2005 |
| WO | 2008/000350 A1 | 1/2008 |
| WO | 2011/051669 A1 | 5/2011 |
| WO | 2011/051670 A2 | 5/2011 |
| WO | 2011/102800 A1 | 8/2011 |
| WO | 2011/107782 A1 | 9/2011 |
| WO | 2011/107783 A1 | 9/2011 |
| WO | 2012/027779 A1 | 3/2012 |
| WO | 2014/085290 A1 | 6/2014 |
| WO | 2015/011493 A1 | 1/2015 |
| WO | 2015/011494 A1 | 1/2015 |

OTHER PUBLICATIONS

May 12, 2016 Search Report issued in International Patent Application No. PCT/JP2016/050657.
May 12, 2016 Written Opinion issued in International Patent Application No. PCT/JP2016/050657.
Sep. 22, 2015 Combined Search and Examination Report issued in British Patent Application No. GB1504838.2.

* cited by examiner

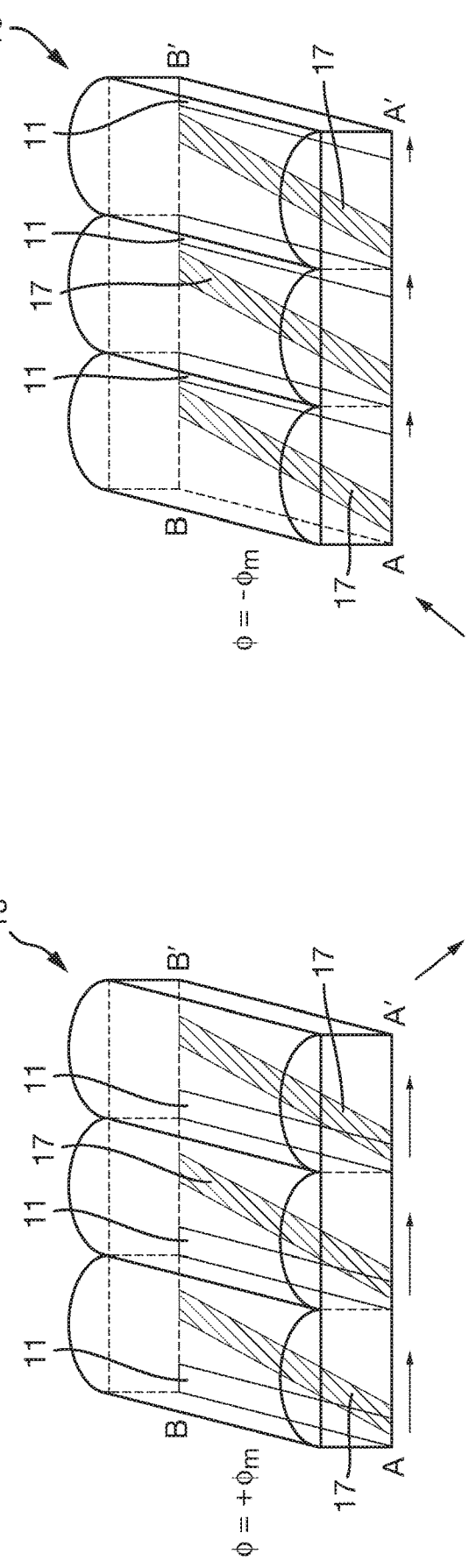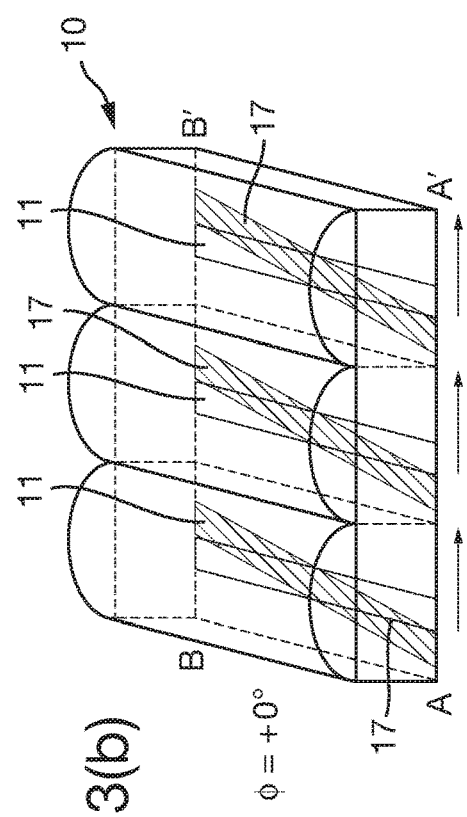

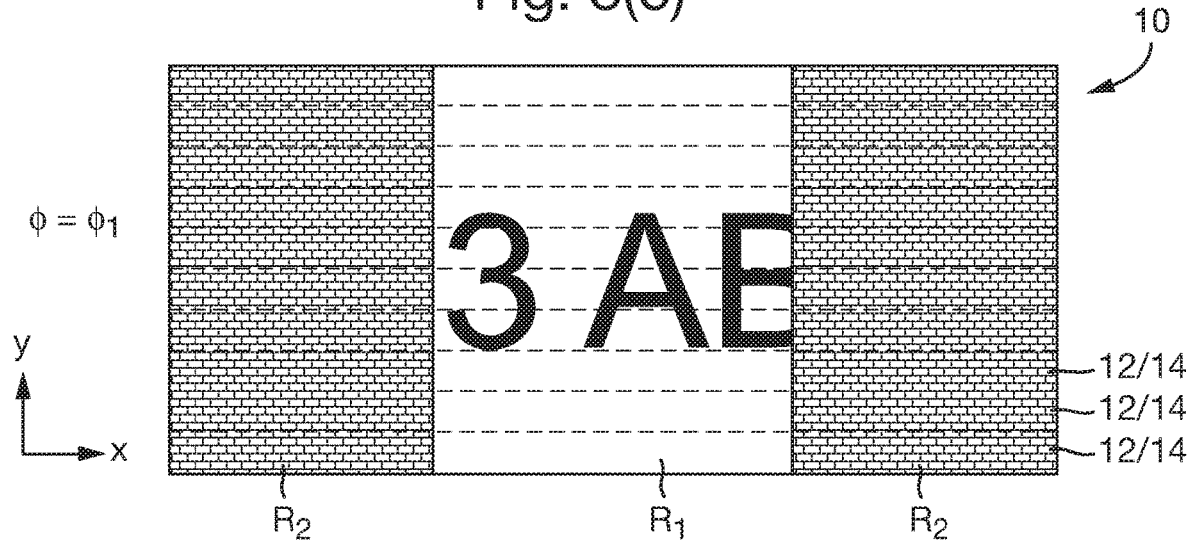
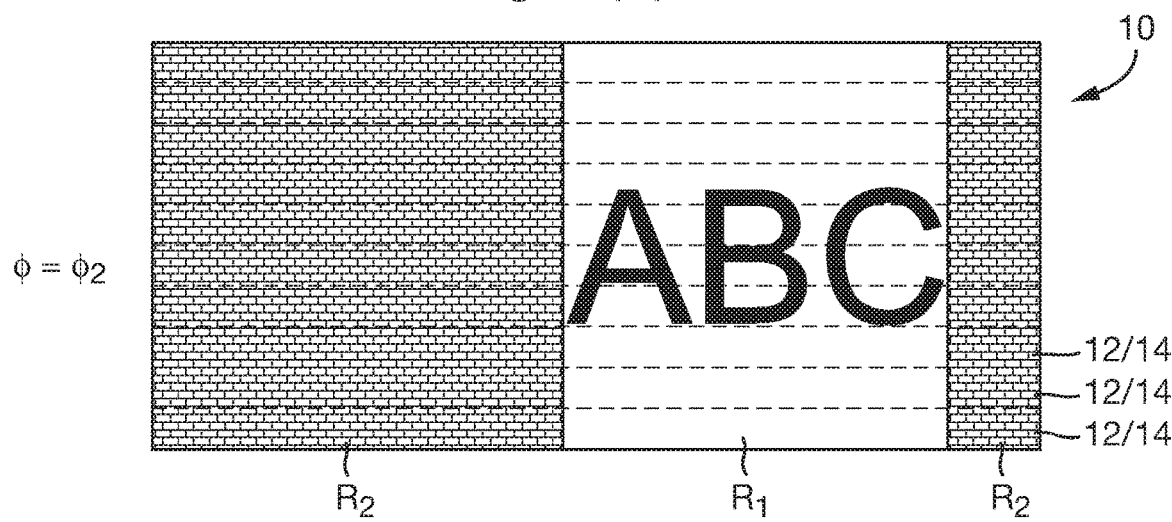

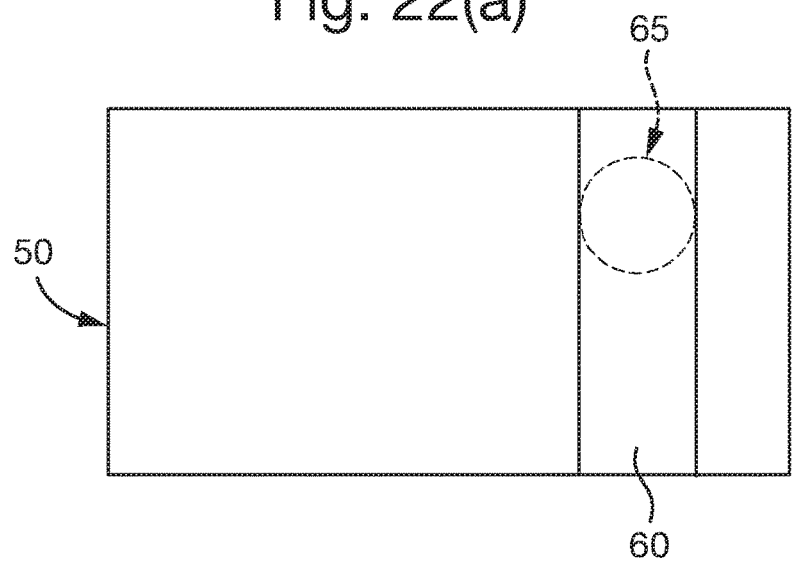
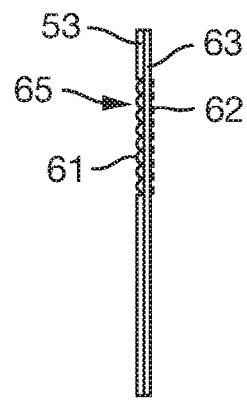
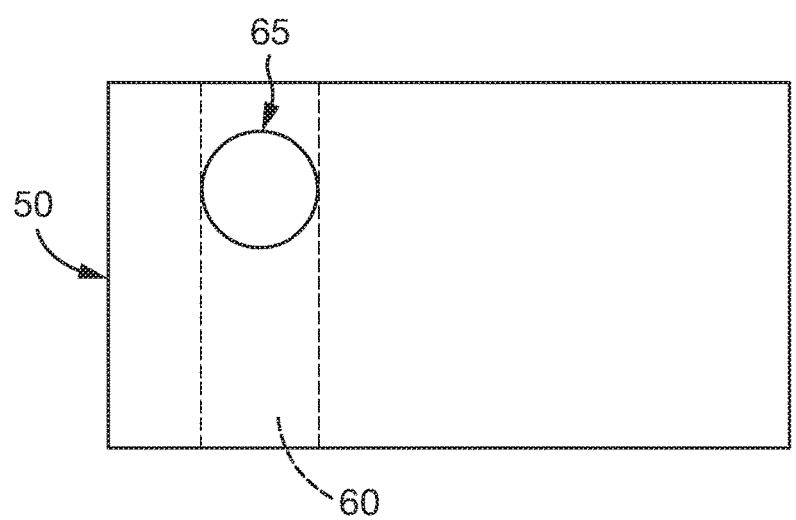

SECURITY DEVICE AND METHOD OF MANUFACTURE

This invention relates to security devices, for example for use on articles of value such as banknotes, cheques, passports, identity cards, certificates of authenticity, fiscal stamps and other documents of value or personal identity. Methods of manufacturing such security devices are also disclosed.

Articles of value, and particularly documents of value such as banknotes, cheques, passports, identification documents, certificates and licences, are frequently the target of counterfeiters and persons wishing to make fraudulent copies thereof and/or changes to any data contained therein. Typically such objects are provided with a number of visible security devices for checking the authenticity of the object. Examples include features based on one or more patterns such as microtext, fine line patterns, latent images, venetian blind devices, lenticular devices, moiré interference devices and moiré magnification devices, each of which generates a secure visual effect. Other known security devices include holograms, watermarks, embossings, perforations and the use of colour-shifting or luminescent/fluorescent inks. Common to all such devices is that the visual effect exhibited by the device is extremely difficult, or impossible, to copy using available reproduction techniques such as photocopying. Security devices exhibiting non-visible effects such as magnetic materials may also be employed.

One class of security devices are those which produce an optically variable effect, meaning that the appearance of the device is different at different angles of view. Such devices are particularly effective since direct copies (e.g. photocopies) will not produce the optically variable effect and hence can be readily distinguished from genuine devices. Optically variable effects can be generated based on various different mechanisms, including holograms and other diffractive devices, and also devices which make use of focusing elements such as lenses, including moiré magnifier devices and so-called lenticular devices.

Moiré magnifier devices (examples of which are described in EP-A-1695121, WO-A-94/27254, WO-A-2011/107782 and WO2011/107783) make use of an array of micro-focusing elements (such as lenses or mirrors) and a corresponding array of microimage elements, wherein the pitches of the micro-focusing elements and the array of microimage elements and their relative locations are such that the array of micro-focusing elements cooperates with the array of microimage elements to generate a magnified version of the microimage elements due to the moiré effect. Each microimage element is a complete, miniature version of the image which is ultimately observed, and the array of focusing elements acts to select and magnify a small portion of each underlying microimage element, which portions are combined by the human eye such that the whole, magnified image is visualised. This mechanism is sometimes referred to as "synthetic magnification".

Lenticular devices on the other hand do not involve synthetic magnification. An array of focusing elements, typically cylindrical lenses, overlies a corresponding array of image elements, each of which depicts only a portion of an image which is to be displayed. Image slices (made up of one or more image elements) from two or more different images are interleaved and, when viewed through the focusing elements, at each viewing angle, only a selected group of image slices, all from the same image, will be directed towards the viewer. In this way, different composite images can be viewed at different angles. However it should be appreciated that no magnification typically takes place and the resulting image which is observed will be of substantially the same size as that to which the underlying image slices are formed. Some examples of lenticular devices are described in U.S. Pat. No. 4,892,336, WO-A-2011/051669, WO-A-2011051670, WO-A-2012/027779 and U.S. Pat. No. 6,856,462. WO-A-2014/085290 also discloses an approach to forming the array of image elements which aims to increase the number of different images which may be incorporated and thereby displayed at different viewing angles.

Lenticular devices have the advantage that different images can be displayed at different viewing angles, giving rise to the possibility of animation and other striking visual effects which are not possible using the moiré magnifier technique. Nonetheless, new devices with different appearances and effects are constantly sought in order to stay ahead of would-be counterfeiters.

In accordance with the present invention, a security device is provided, comprising:
  an array of elongate focusing structures, the elongate axes of which are aligned along a first direction, the elongate focusing structures being arranged parallel to one another periodically along a second direction which is orthogonal to the first direction, each elongate focusing structure having an optical footprint of which different elongate strips will be directed to the viewer in dependence on the viewing angle, the centre line of each optical footprint being parallel with the first direction; and
  an array of image elements overlapping the array of elongate focusing structures, the array of image elements representing elongate image slices of at least two respective images, each image slice comprising one or more image elements, and at least one image slice of each respective image being located in the optical footprint of each elongate focusing structure;
  wherein the array of image elements is configured such that the distance in the second direction of each image slice from the centre line of an optical footprint in which the image slice is located changes along the first direction;
  whereby, at at least some viewing angles, the elongate strip of the optical footprint of each elongate focusing structure which is directed to the viewer includes a portion of a first image slice corresponding to a first image and a portion of a second image slice corresponding to a second image, such that the first image is displayed by a first region of the security device and the second image is displayed by a second region of the security device which is laterally offset from the first region in the first direction, the positions of the first and second regions along the first direction depending on the viewing angle.

By arranging the image slices in this way, so that each one is not parallel to the elongate axes of the focusing structures, a new visual effect is generated by the device. Preferred implementations of the elongate focusing structures will be described below, although it should be noted that in some cases these may comprise non-elongate focusing elements, arranged so as to form elongate focusing structures. The optical footprint of each elongate focusing structure will generally correspond in terms of shape and alignment to those of the elongate focusing structure itself, and its centre line is the straight line equidistant from the two long sides of the optical footprint at each location along the first direction (hence the centre line will be parallel to the first direction).

It should be appreciated that the disclosed security device is an example of a lenticular device as described above, and as such each image element is a portion (e.g. an individual pixel, or a group or line of pixels) of a corresponding image, not a miniature version of the corresponding image (as would be the case in a moiré magnifier type device). The focusing structures preferably do not perform any magnification. Also the device does not operate on Moiré interference principles: the (one-dimensional) periodicity of the image element array and focusing structure array should be substantially matched in the second direction. At any one viewing angle, a portion of each optical footprint is thus directed to the viewer by the focusing structures and it is the combination of these selected portions across the array which together define the appearance of the device.

In conventional lenticular devices utilising elongate focusing elements, such as those disclosed in U.S. Pat. No. 4,892,336, WO-A-2011/051669, WO-A-2011051670, WO-A-2012/027779, and WO-A-2014/085290, the image slices are arranged parallel to the focusing elements such that, at any one viewing angle, a single one of the image slices in each optical footprint will be directed to the viewer along the whole length of each focusing element, or if there is any cross-talk from neighbouring image slices the extent of this will be constant along the length, such that a single one of the images is displayed (or at least dominates the display) across the device.

In contrast, at at least some viewing angles (preferably all), the presently disclosed device will display at least two images to the viewer simultaneously, in corresponding regions of the device which are laterally offset from one another along the axial direction of the focusing structures. This is because at least two image slices (from different images) will intersect the area of the optical footprint of each focusing structure which is directed to the viewer at any one viewing angle (which will be an elongate strip parallel to the focusing structures) due to their arrangement. Hence the area of the optical footprint directed to the viewer at any one viewing angle will include a portion of at least two image slices, giving rise to a first image being displayed in one region of the device and a second image being displayed in a second region of the device.

The location of each region will also depend on the viewing angle, with the result that as the viewing angle is changed in the direction orthogonal to the long axes of the focusing structures (e.g. by tilting the device), the regions displaying the respective images will appear to move along the axial direction. Different portions of the respective images will be displayed by the device as the regions move along the axial direction, giving rise to a sliding "reveal" visual transition from one image to the next. This striking visual effect is readily distinguished from conventional lenticular devices in which substantially the whole area of the device will transition from one image to the next at the same angle of view, giving the impression of a "switch" from one image to another. The new visual effect provided by the presently disclosed device therefore represents a significant challenge to counterfeiters and increases the security level of the device.

Preferably, each image slice is arranged along a path which makes a non-zero and non-orthogonal angle $\theta$ with the first direction. The greater the magnitude of $\theta$, the shorter the distance the regions will appear to move along the first direction per unit of tilt (i.e. change in viewing angle), and hence the "slower" the apparent rate of motion of the regions (although each region will complete its available range of motion along the device more quickly since this is also shortened). In other words, the rate of skew movement with changing viewing angle is inversely proportional to the skew angle $\theta$. It should be noted that the path could be straight or curved, or made up of multiple straight segments. As such the value of $\theta$ may not be constant but may vary with position along the first direction as described further below.

Thus in some preferred embodiments, the path of each image slice is rectilinear, the angle $\theta$ between the path and the first direction being constant along the first direction. In this case the rate at which each region appears to move along the device upon tilting will be constant along the axial direction of the device. In other preferred embodiments, the path of each image slice is curved or formed of multiple (at least two) straight segments, the angle $\theta$ between the path and the first direction increasing or decreasing (preferably always in the same sense along the device, or in one sense along a first part of the device and the other sense along a second part of the device) along the first direction. If the path is curved, the angle $\theta$ is measured as the angle between the first direction and the tangent to the curved path at any particular point. If $\theta$ increases along the first direction, the rate of movement of the regions will appear to slow, i.e. decelerate, as the regions move in the first direction (and conversely will accelerate when the regions move in the opposite direction upon tilting the device in the reverse sense). If $\theta$ decreases along the first direction, the opposite effects will be observed. A curved path will result in a continuous (i.e. gradual) acceleration or deceleration whilst a path formed of multiple straight segments will exhibit discrete steps in the apparent rate of motion upon tilting as the different segments of the path are encountered. The path can be configured using these principles to generate complex visual effects which thereby further increase the security of the device.

It should be noted that each image slice may or may not be contiguous along its path. In some preferred embodiments, each image slice comprises a corresponding elongate image element (straight or curved) extending along the path such that the distance of the image slice from the centre line of an optical footprint in which the image slice is located changes (e.g. increases or decreases) continuously, i.e. gradually as opposed to step-wise, along the first direction. In this case the image slice will be contiguous. It should be noted that the continuous change in distance need not always be in the same sense: for example, the path of the image slice could gradually move away from the centre line and then gradually back towards it. However, in other preferred embodiments, each image slice comprises a set of at least two image elements positioned along the path such that the distance of the image slice from the centre line of an optical footprint in which the image slice is located changes discretely (i.e. step-wise) along the first direction. The at least two image elements forming the set may contact one another or could be spaced from one another (optionally by image elements forming parts of other image slices, from different images), in which case the image slice will not be contiguous. Since the position of the image slice will change in steps rather than gradually along the first direction, the apparent motion of the regions exhibited upon tilting will appear to take place in discrete stages rather than as one smooth motion. This may be desirable depending on the design of the device.

Where each image slice comprises a set of at least two image elements, advantageously the array of image elements are arranged on a grid, preferably an orthogonal grid, the axes of the grid being non-parallel with the paths of the image slices. For instance, a standard orthogonal grid of square, rectangular or hexagonal image elements could be utilised. Preferably, the axes of the grid are parallel to the first and second directions. Advantageously, the image elements are elongate, preferably in the first direction.

The shape of the image slice path (and hence the speed of motion of the visual effect and any acceleration or deceleration) can be determined by the positioning of the image elements forming the set or analogously by the selection of image elements from the array to form the set representing one image slice. Hence in some preferred examples, the spacing in the first and second directions between each one of the set of image elements and the next one of the set of image elements is constant along the first direction. This will result in a rectilinear path of constant angle $\theta$ and hence a constant rate of motion along the device. In other preferred embodiments, the spacing in the first and/or second directions between each one of the set of image elements and the next one of the set of image elements varies along the first direction. This can be used to form a curved path or a path with multiple straight segments, thereby exhibiting acceleration or deceleration effects as described above.

In some embodiments, the arrangement of the image slices and the dimensions of the focusing elements may be such that only one first region displaying the first image will be exhibited by the device at any one time, this first region moving along the length of the device upon tilting. This is achieved by arranging the maximum length of the device in the first direction to be no greater than $w/(\tan \theta)$, where w is the width of the focusing structures in the second direction (corresponding approximately to the width of their optical footprints), and $\theta$ is as previously defined. In especially preferred examples, the maximum length of the device in the first direction is configured to be substantially equal to $w/(\tan \theta)$, so that each region appears to move the full length of the device. In other preferred embodiments, each image slice crosses two or more of the optical footprints of the elongate focusing structures, which is achieved by arranging the maximum length of the device in the first direction to be greater than $w/(\tan \theta)$. This has the result that, at at least some viewing angles, the elongate strip of the optical footprint of each elongate focusing structure which is directed to the viewer includes a portion of each of at least two first image slices corresponding to the first image and a portion of each of at least two second image slices corresponding to the second image, such that the first image is displayed by at least two first regions of the security device, spaced from one another, and the second image is displayed by at least two second regions of the security device which are laterally offset from the first regions in the first direction, the positions of the first and second regions along the first direction depending on the viewing angle. Visually, this appears as a "shutter" transition as parallel bands of first regions move along the device interspersed with bands of second regions.

Even more complex visual effects can be achieved by arranging the regions displayed in different parts of the device to exhibit different types of motion, simultaneously, e.g. in terms of direction and/or rate per unit change in viewing angle. In a particularly preferred embodiment, in a first part of the security device, the array of image elements is configured such that the distance in the second direction of each image slice from the centre line of an optical footprint in which the image slice is located increases along the first direction, and in a second part of the security device laterally offset from the first part, the array of image elements is configured such that the distance in the second direction of each image slice from the centre line of an optical footprint in which the image slice is located decreases along the first direction, such that upon tilting the regions displaying each respective image move in opposite senses along the first direction in the first and second parts of the device. In this way the apparent motion may appear to emanate from some position within the device (e.g. its mid-point), rather than from one end or the other. The resulting relative motion also acts to accentuate the sense of movement achieved by the device.

In some preferred implementations, the first and second parts of the device are laterally offset relative to one another along the first direction such that upon tilting the regions displaying each respective image in the first and second parts of the device move towards or away from one another. The two parts may be aligned with one another along the first direction, preferably abutting one another, or could also be offset in the second direction. Alternatively, the first and second parts of the device may be laterally offset relative to one another along the second direction such that upon tilting the regions displaying each respective image in the first and second parts of the device move past one another. In this case, preferably the two parts overlap one another at least partially in the first direction.

As indicated above, the rate of apparent motion of the regions depends on the arrangement of the image slices and particularly the effective angle $\theta$ between the path of the image slice and the first direction. The inventor has found that particularly good results are achieved where the angle $\theta$ is in the range 0.01 to 1 degree, preferably 0.01 to 0.5 degrees, more preferably 0.05 to 0.4 degrees, still preferably 0.1 to 0.3 degrees. Small angular skews of this order are preferred because:

a) As the angle $\theta$ increases, the rate of movement decreases and at large angles $\theta$ (i.e. greater than a few degrees) the visual effect upon tilting may become substantially static; and b) It is also desirable that for narrow feature windows there is a continuous movement effect across the whole window upon tilting through the full range of available viewing angles. For example, in a 4 mm wide thread we have the possibility of visualising 3 to 4 mm of movement. If the skew angle $\theta$ is too large, the apparent motion effect may not extend across the full distance available, e.g. covering only 2 mm of the thread, which would diminish its visual impact and not make full use of the space available. For instance, to achieve full width movement in a 4 mm wide thread with 30 micron lens pitch, the angle $\theta$ is approximately 0.2 degrees, whereas for a 20 mm wide polymer window with lens pitch of 70 microns, full width movement occurs at $\theta$=approximately 0.1 degrees.

Throughout this specification, the term "elongate focusing structure" should be understood as encompassing both a single, elongate focusing element and (alternatively) a set of at least two focusing elements arranged to collectively form an elongate focusing structure (but which need not, individually, be elongate). Hence, in some preferred embodiments, each elongate focusing structure comprises an elongate focusing element, preferably a cylindrical focusing element. Thus the array of elongate focusing structures could be a regular array of linear focusing elements with periodicity in one dimension only (parallel to the second direction).

However in other preferred implementations, each elongate focusing structure comprises a plurality of focusing elements, preferably spherical or aspherical focusing elements, arranged such that the centre point of each focusing element is aligned along a straight line in the first direction (which in practice will correspond to the centre line of the optical footprint). In this case, for example, the focusing elements could be arranged in an orthogonal array (square or rectangular) or in a hexagonal array. Hence the array of elongate focusing structures may have a two-dimensional periodicity. Where each elongate focusing structure comprises a plurality of elements, preferably those elements substantially abut one another along the first direction or at least have no intervening focusing elements with centre points which are not on the same straight line.

Forming each elongate focusing element as a line of focusing elements such that the array has two-dimensional periodicity has a number of potential benefits. Firstly, such implementations have been found to exhibit good visual effects over a larger range of viewing angles (i.e. lower viewing angle dependence) as compared with devices using cylindrical lenses. Secondly, the use of such arrays improves the design freedom since different "first directions" can be defined relative to the same array in different regions of the device. For example, in an orthogonal grid of elements either of the two orthogonal axes could be used as the first direction so in a first part of the device the image slices could be arranged at the desired angle $\theta$ to one of the orthogonal axes (locally acting as the first direction), and in a second part of the device the image slices could be arranged at the desired angle $\theta$ to the other of the orthogonal axes (locally acting as the second direction). In this way the two parts of the device will exhibit different effects (one appearing active when tilting occurs in a first direction, whilst the other is static, and vice versa when tilting occurs in an orthogonal direction), achieved through design of the image array only and not requiring any distinction between the focusing elements in each part of the device. This also avoids the need for any translational registration between the image array and the focusing elements.

In all cases, the focusing elements making up the focusing structure array are preferably lenses or mirrors. The periodicity of the focusing structure array in the second direction (and optionally in the first direction) and therefore maximum width of the individual focusing elements in the second direction is related to the device thickness and is preferably in the range 5-200 microns, still preferably 10 to 70 microns, most preferably 20-40 microns. The focusing elements can be formed in various ways, but are preferably made via a process of thermal embossing or cast-cure replication. Alternatively, printed focusing elements could be employed as described in U.S. Pat. No. 6,856,462. If the focusing elements are mirrors, a reflective layer may also be applied to the focusing surface.

In some preferred embodiments, the image elements are defined by inks. Thus, the image elements can be simply printed onto a substrate although it is also possible to define the image elements using a relief structure. This enables much thinner devices to be constructed which is particularly beneficial when used with security documents. Suitable relief structures can be formed by embossing or cast-curing into or onto a substrate. Of the two processes mentioned, cast-curing provides higher fidelity of replication.

A variety of different relief structures can be used as will described in more detail below. However, the image elements could be created by embossing/cast-curing the images as diffraction grating structures. Differing parts of the image could be differentiated by the use of differing pitches or different orientations of grating providing regions with a different diffractive colour. Alternative (and/or additional differentiating) image structures are anti-reflection structures such as moth-eye (see for example WO-A-2005/106601), zero-order diffraction structures, stepped surface relief optical structures known as Aztec structures (see for example WO-A-2005/115119) or simple scattering structures. For most applications, these structures could be partially or fully metallised to enhance brightness and contrast. Typically, the width of each image element may be less than 50 microns, preferably less than 40 microns, more preferably less than 20 microns, most preferably in the range 5-10 microns.

Any number of image slices per optical footprint (at least 2) could be provided and this will depend on factors including the number of different images which it is desired to present. In theory there is no upper limit as to the number of image element positions which could be included, but, in practice, the image resolution will be reduced as the number of image slices increases since an ever-decreasing proportion of the unit cell area (and hence of the device as a whole) will be available for display of each respective image. Also, in practical implementations the number of image elements which can be formed in one optical footprint will be limited by the resolution at which the image elements can be formed.

For example if using an ink-based printing method to form the image elements with a minimum print dimension of 15 microns then for a 30 micron wide footprint, a maximum of 2 image slices can be provided across the width of the footprint. Supposing however the minimum print dimension can be reduced to the level of around 1 micron (e.g. through the use of relief structures rather than printing to form the image elements) then the number of image elements may more likely be constrained by the desired visual effect and the size of image data file that can be managed during the origination of the print tool. The type of design effects which require a high number of matrix positions would include animation effects and more especially continuous and horizontal parallax effects.

Preferably, the array of image elements is located approximately in the focal plane of the focusing structures. Typical thicknesses of security devices according to the invention are 5 to 200 microns, more preferably 10 to 70 microns, with lens heights of 1 to 70 microns, more preferably 5 to 25 microns. For example, devices with thicknesses in the range 50 to 200 microns may be suitable for use in structures such as over-laminates in cards such as drivers licenses and other forms of identity document, as well as in other structures such as high security labels. Suitable maximum image element widths (related to the device thickness) are accordingly 25 to 50 microns respectively. Devices with thicknesses in the range 65 to 75 microns may be suitable for devices located across windowed and half-windowed areas of polymer banknotes for example. The corresponding maximum image element widths are accordingly circa 30 to 37 microns respectively. Devices with thicknesses of up to 35 microns may be suitable for application to documents such as paper banknotes in the form of slices, patches or security threads, and also devices applied on to polymer banknotes where both the lenses and the image elements are located on the same side of the document substrate.

If the image elements are formed as a relief structure, the relief depth depends on the method used to form the relief. Where the relief is provided by a diffractive grating the depth would typically be in the range 0.05-1 µm and where a coarser non-diffractive relief structure is used, the relief depth is preferably in the range 0.5 to 10 µm and even more preferably 1 to 5 µm.

Embodiments of the invention can be implemented without registering the focusing elements to the image elements along the first or second direction. However, such registration is preferred in certain embodiments in order that the resulting visual effect can be better controlled. In particular, registration enables control over the location of each region along the device at each viewing angle.

Each respective image which the device is configured to display could take any form. In some preferred embodiments, at least one of the first and second images is a uniform colour (i.e. a solid, unpatterned colour block) or is blank (e.g. transparent). This can provide a clear contrast when used in combination with one or more images of greater complexity: for example the uniform image can appear as a cover which slides across the device to reveal or hide a second image, or if left blank or transparent the second image will appear to transition to blank, i.e. appear and disappear. If all of the images are (different) uniform colours and/or blank, the device will appear to display stripes of the various colours arranged along the first direction which move in the manner described upon tilting. More complex images which may be used to form at least one of the first and second images include any of: a letter, number, symbol, character, logo, portrait or graphic. In particularly preferred examples, one or more (preferably all) of the images may be configured to co-operate visually with the above-described transitional motion effect. For example, where the motion is configured to emanate from some location inside the device (e.g. from a line mid-way along the device), one or more of the images may be symmetrical about that location or display an appropriate indicia at that location. Such designs help to visually link the motion effect to the image(s) displayed by the device, which increases the integration of the security effects.

Also provided is a security device assembly comprising at least two security devices each as described above, wherein the first direction along which the elongate focusing structures are aligned in each security device is different, preferably orthogonal to one another. In this way, different ones of the devices will be configured to exhibit the above-described effects upon tilting in different directions. As mentioned above this can be achieved using a two-dimensional grid of focusing elements which is continuous across both devices. However in other cases each device could be provided with a different array of focusing elements (e.g. different in terms of orientation, pitch and/or focusing element type). The at least two devices preferably abut one another although could be spaced from one another depending on the design.

Preferably, the security device or security device assembly is formed as a security thread, strip, foil, insert, label or patch. Such devices can be applied to or incorporated into articles such as documents of value using well known techniques, including as a windowed thread, or as a strip covering an aperture in a document. Preferably, the article is selected from banknotes, cheques, passports, identity cards, certificates of authenticity, fiscal stamps and other documents for securing value or personal identity.

Alternatively, such articles can be provided with integrally formed security devices of the sort described above. Thus in preferred embodiments, the article (e.g. a polymer banknote) comprises a substrate with a transparent portion, on opposite sides of which the focusing elements and elongate image elements respectively are provided.

The invention further provides a method of manufacturing a security device comprising:
  providing an array of elongate focusing structures, the elongate axes of which are aligned along a first direction, the elongate focusing structures being arranged parallel to one another periodically along a second direction which is orthogonal to the first direction, each elongate focusing structure having an optical footprint of which different elongate strips will be directed to the viewer in dependence on the viewing angle, the centre line of each optical footprint being parallel with the first direction; and
  overlapping an array of image elements with the array of focusing elements, the array of image elements representing elongate image slices of at least two respective images, each image slice comprising one or more image elements, and at least one image slice of each respective image being located in the optical footprint of each elongate focusing structure;
  wherein the array of image elements is configured such that the distance in the second direction of each image slice from the centre line of an optical footprint in which the image slice is located changes along the first direction;
  whereby, at at least some viewing angles, the elongate strip of the optical footprint of each elongate focusing structure which is directed to the viewer includes a portion of a first image slice corresponding to a first image and a portion of a second image slice corresponding to a second image, such that the first image is displayed by a first region of the security device and the second image is displayed by a second region of the security device which is laterally offset from the first region in the first direction, the positions of the first and second regions along the first direction depending on the viewing angle.

The result is a security device having the attendant benefits described above. The method can be adapted to provide the device with any of the features described previously.

Examples of security devices will now be described and contrasted with conventional devices, with reference to the accompanying drawings, in which:

FIGS. 3a, 3b and 3c show the security device of FIG. 2 at three different viewing angles;

FIGS. 8c and 8d show such a security device in accordance with a further embodiment of the invention, at two different viewing angles;

Figure 14:
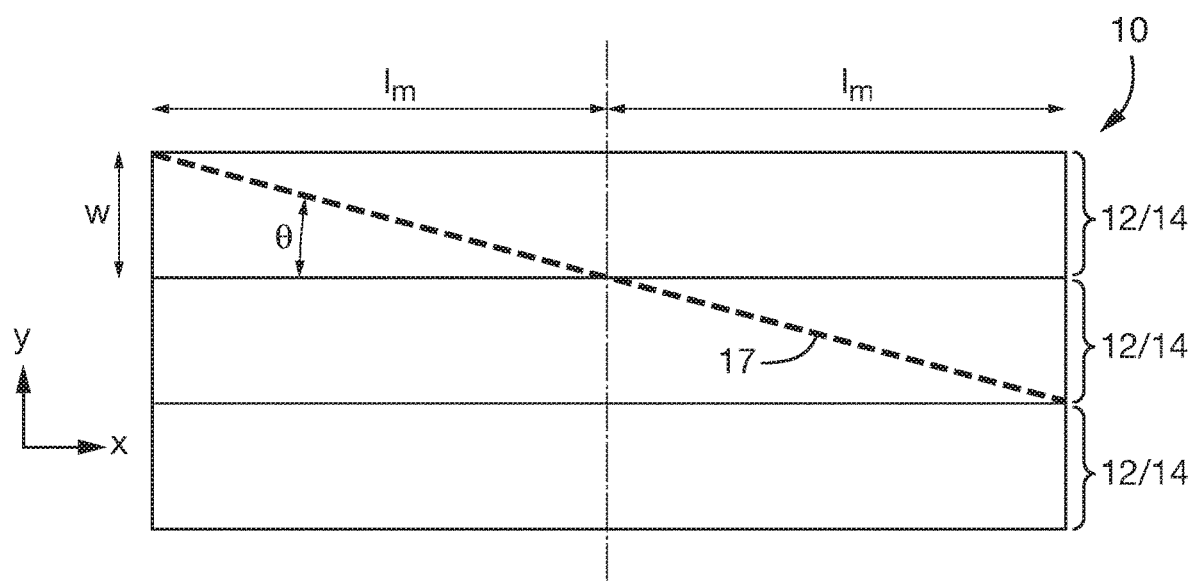
Figure 15A:
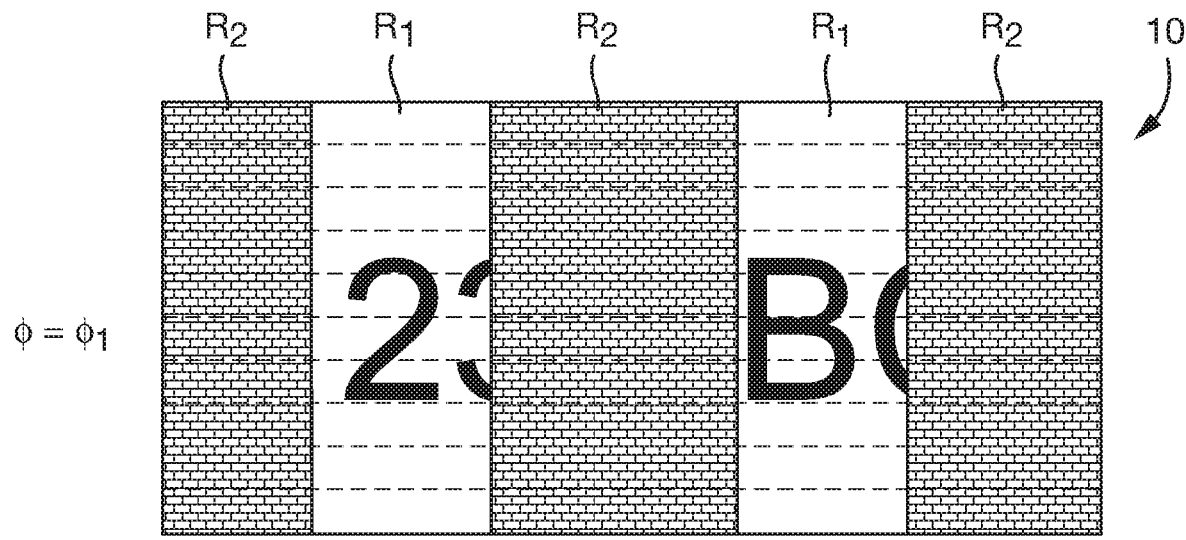
Figure 15B:
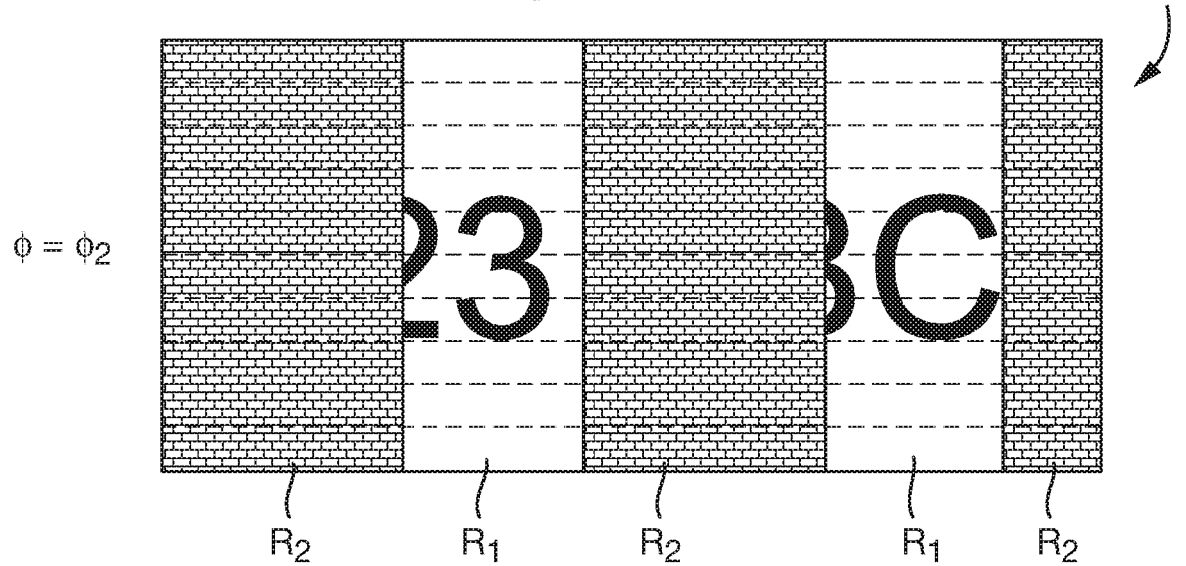
Figure 16A:
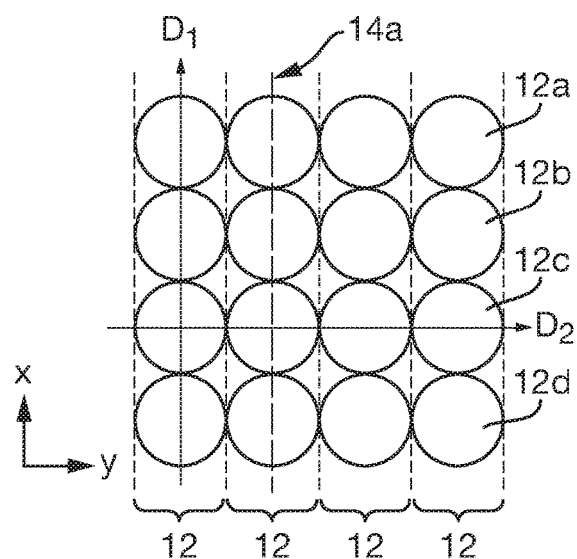
Figure 16B:
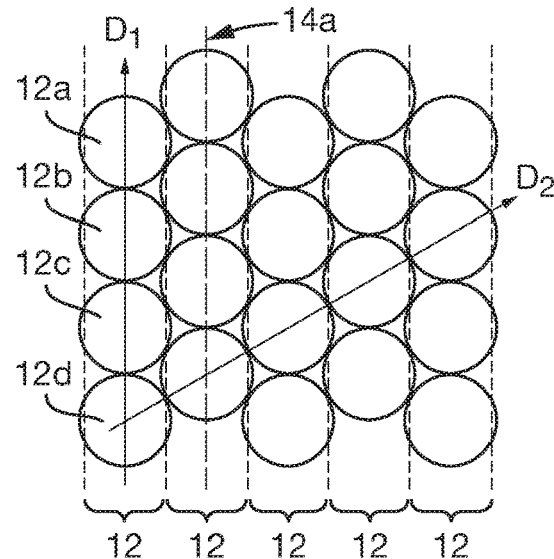
Figure 17:
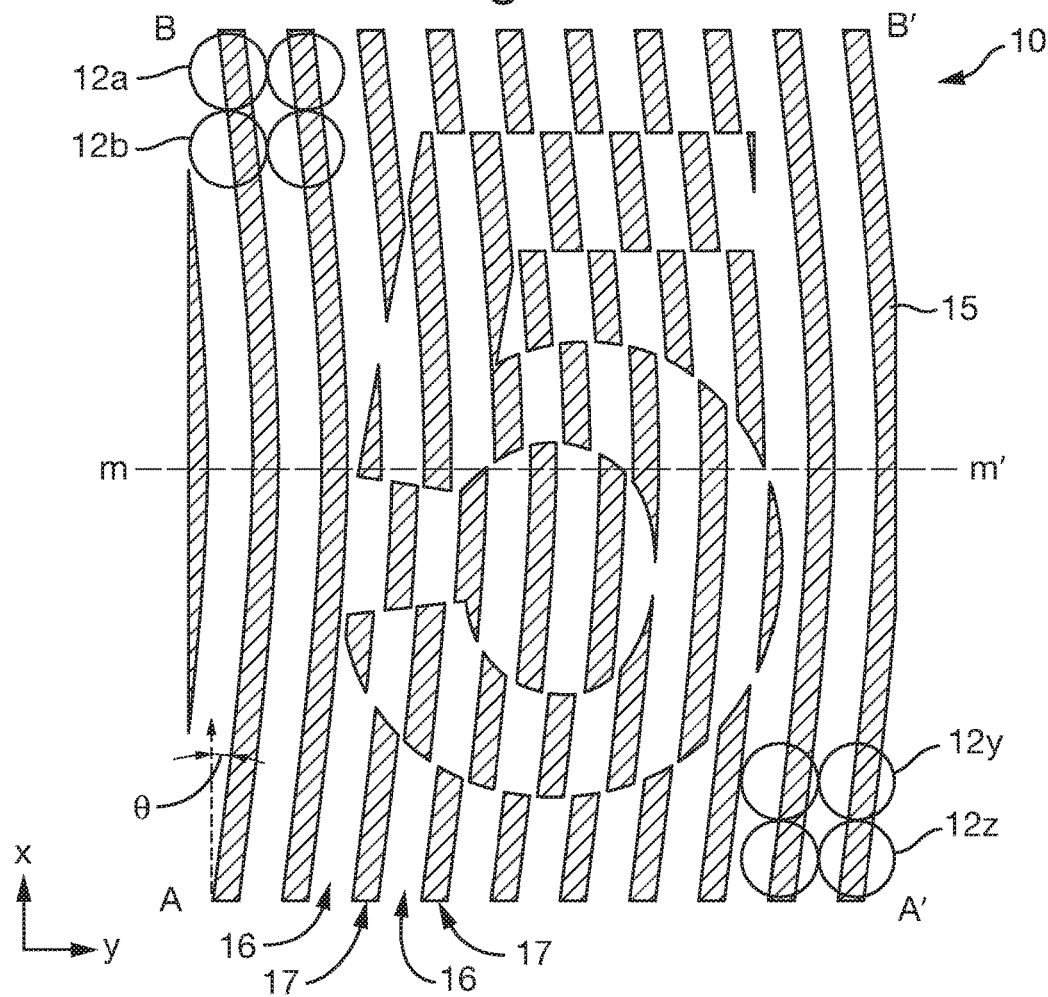
Figure 19A:
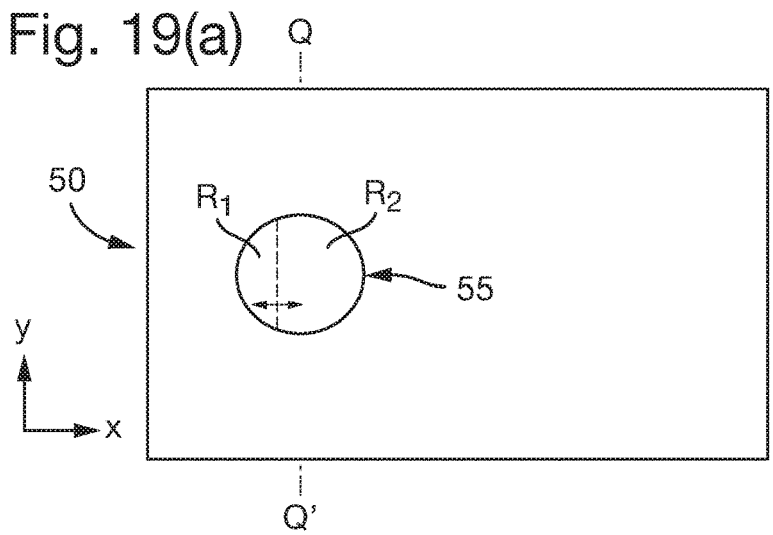
Figure 19B:
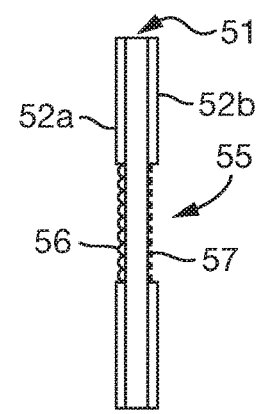
Figure 20A:
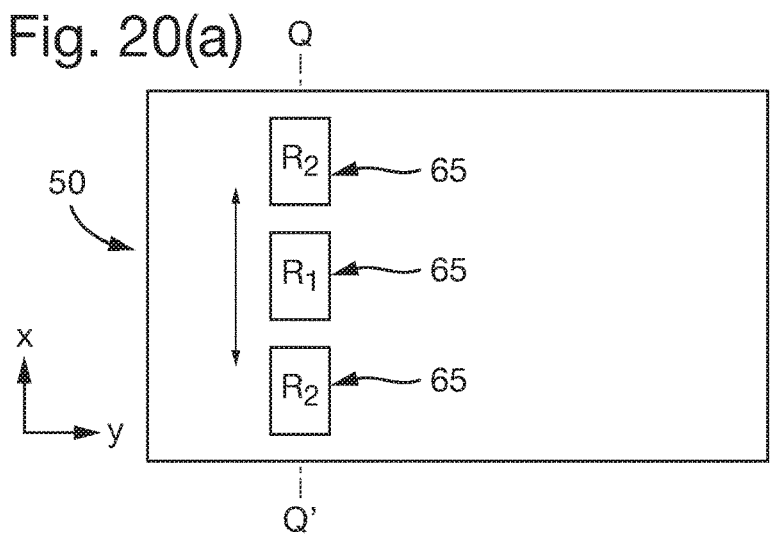
Figure 20B:
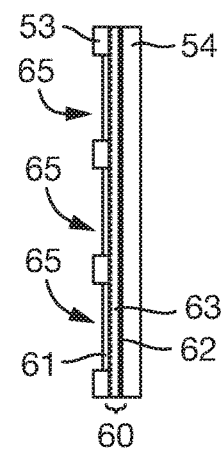
Figure 21A:
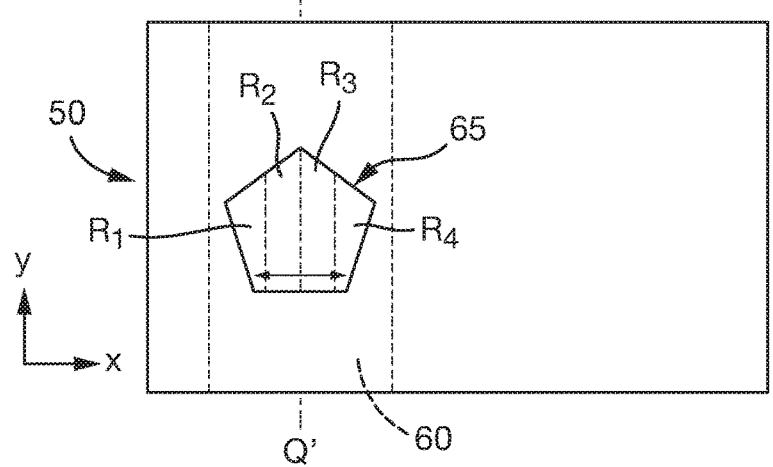
Figure 21B:
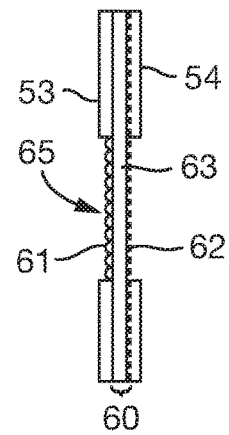

9b shows a cross-sectional view of one focusing element of the device and its corresponding optical footprint;

FIGS. 10, 11, 12 and 13 show schematic plan views of further examples of security devices in accordance with embodiments of the present invention;

FIG. 14 shows a schematic plan view of a security device in accordance with a further embodiment of the invention;

FIGS. 15a and 15b show plan views of an exemplary security device in accordance with FIG. 14, at two different viewing angles;

FIGS. 16a and 16b show two alternative examples of arrays of elongate focusing structures which may be utilised in any embodiment of the security devices disclosed herein, in plan view;

FIG. 17 shows an exemplary image array of a further security device in accordance with an embodiment of the invention;

FIGS. 18a to 18i illustrate different examples of relief structures which may be used to define image elements in accordance with embodiments of the present invention;

FIGS. 19, 20 and 21 show three exemplary articles carrying security devices in accordance with embodiments of the present invention, a) in plan view and b) in cross-section; and FIG. 22 illustrates a further embodiment of an article carrying a security device in accordance with embodiments of the present invention, a) in front view, b) in back view and c) in cross-section.

Figure 1A:
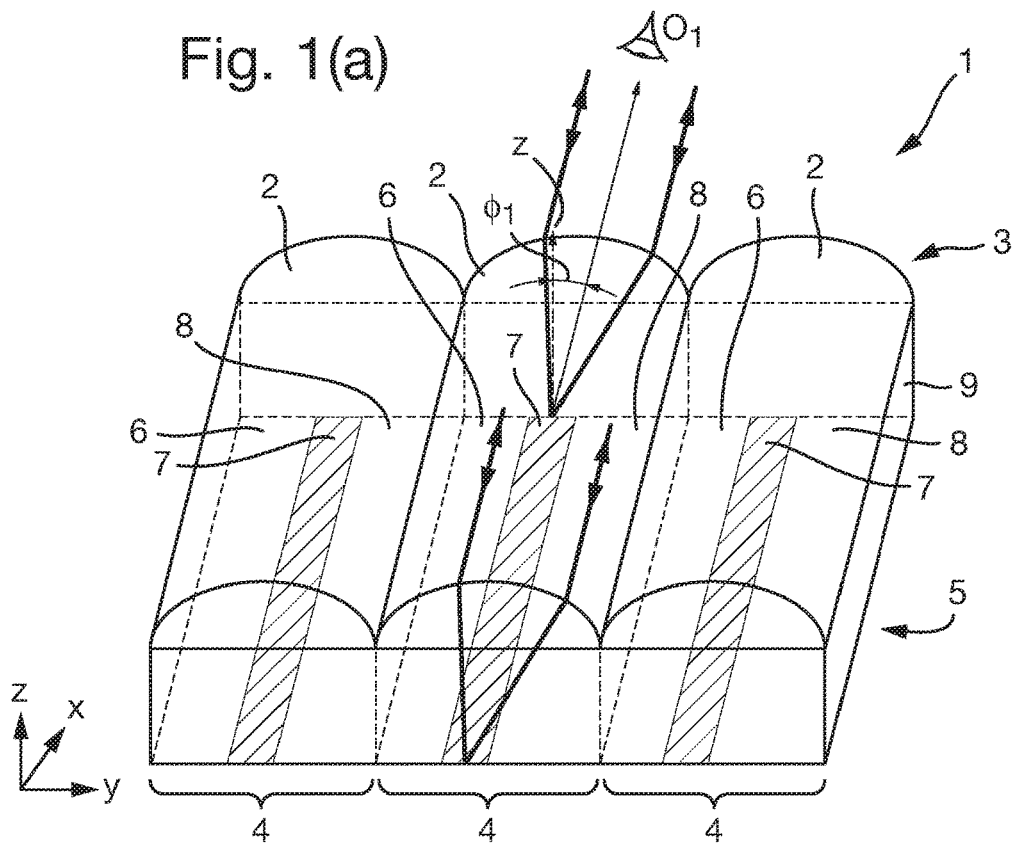
FIGS. 1a and 1b are perspective views of a comparative example of a security device.
Figure 1B:
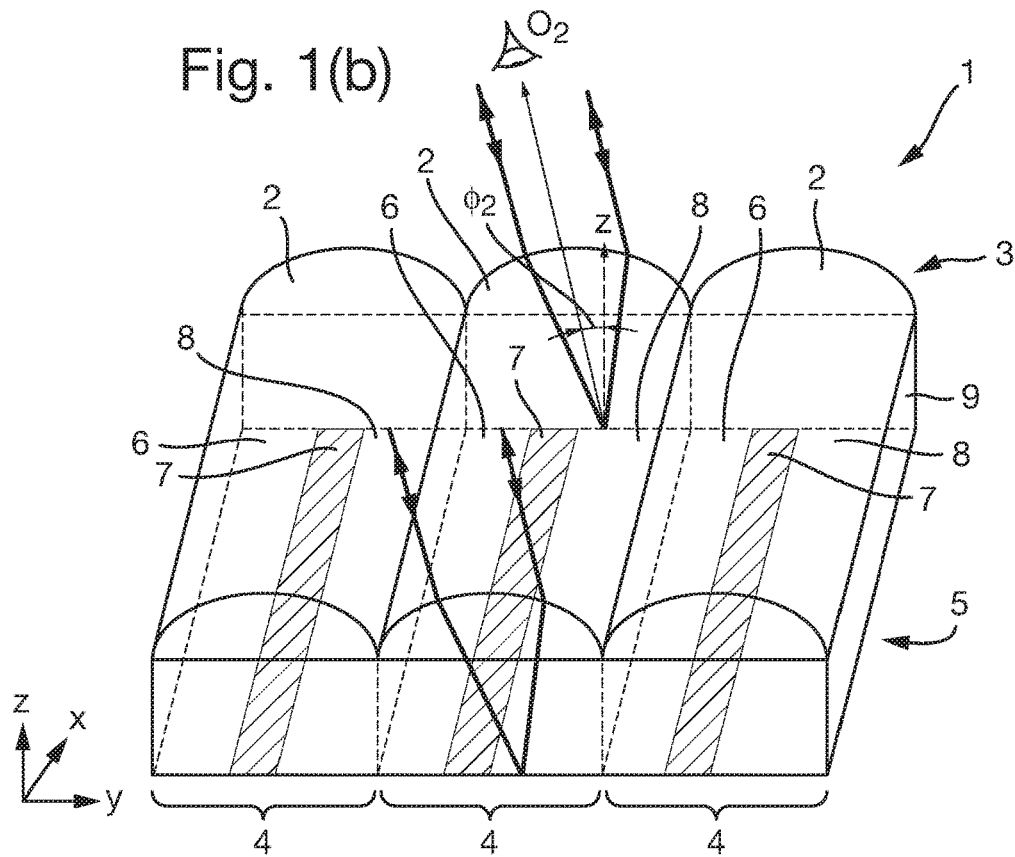

A comparative example of a lenticular device 1 is shown in FIGS. 1a and 1b in order to illustrate certain principles of operation. FIG. 1a shows the device in a perspective view and it will be seen that an array of three of cylindrical lenses 2 is arranged on a transparent substrate 9. An image element array 5 is provided on the opposite side of substrate 9 underlying (and overlapping with) the cylindrical lenses. Alternatively the image element array 5 could be located on the same surface of the substrate 9 as the lenses, directly under the lenses. Each cylindrical lens 2 has a corresponding optical footprint 4 which is the area of the image element array 5 which can be viewed via the corresponding lens 2. In this example, the image element array 5 comprises a series of image slices, of which three slices 6, 7 and 8 are provided in each optical footprint. Purely for illustration, in this example, slices 6 and 8 both represent the same image, whereas slices 7 (depicted as shaded) represent a different image. The image of which slices 7 forms part will be referred to as the "first" image and that from which slices 6 and 8 are taken will be referred to as the "second" or "background" image. The image slices 6, 7 and 8 are all arranged to lie with their long axes parallel to those of the cylindrical lenses 2, along a first direction which here corresponds to the X axis. For reference, the orthogonal direction (Y axis) may be referred to as the second direction of the device.

When the security device 1 is viewed by an observer, at any one viewing angle $\phi$, an elongate strip of each optical footprint 4 is directed to the viewer by the lens array 3. For instance, as shown in FIG. 1a, when observer $O_1$ views the security device 1 at a viewing angle $\phi_1$, each lens 2 directs light from image slice 7 to the viewer. The result is that the first image, carried by image slices 7, is displayed to the observer $O_1$ across the whole area of the device (it should be noted that for clarity schematic light rays are only depicted in relation to the central lens in each diagram but the same mechanism will occur within each optical footprint across the device).

When the viewing angle is changed, e.g. by tilting the device about the X axis, a different portion of each optical footprint 4 will now be directed to the viewer. For example, as shown in FIG. 1b, here the observer $O_2$ is located at a viewing angle $\phi_2$ at which the image strip 8 will be directed to the observer and hence the second or background image will be visible across the device. The whole device will appear to transition from the first image to the second image at some angle in between $\phi_1$ and $\phi_2$. For instance, if the first image carried by image slices 7 is a uniform black area and the second image carried by image slices 6 and 8 is a uniform white or transparent area, the device will appear to switch from black all-over to white all-over (or vice versa) as the device is titled about the X axis.

More generally, the images carried by each set of image slices need not be solid colours but typically will be more complex, carrying for example letters, numbers, symbols, logos, portraits, patterns or any other desired graphics. Thus, in order to carry such information, each of the image slices from any one respective image will typically be different from one another and may also vary along the length of the image slice. However, for the purposes of the present explanation it will be assumed that solid coloured images are utilised such that all of the image slices from each respective image are the same as one another and have no data variation along the long axis of the device. This applies to all of the embodiments of the invention described below unless otherwise specified.

Additionally, whilst the device shown in FIG. 1 makes use of an array of one-dimensional elongate lenses 12, substantially the same effects can be achieved using a two-dimensional array of non-elongate lenses (e.g. spherical or aspherical lenses) arranged such that a straight line of such lenses takes the place of each individual elongate lens 12 shown in FIG. 1. The term "elongate focusing structure" is used to encompass both of these options. Hence, in all of the embodiments that follow, it should be noted that the elongate lenses described are preferred examples of elongate focusing structures and could be substituted by lines of non-elongate focusing elements. Specific examples of this will be given below in relation to FIGS. 16 and 17.

Figure 2:
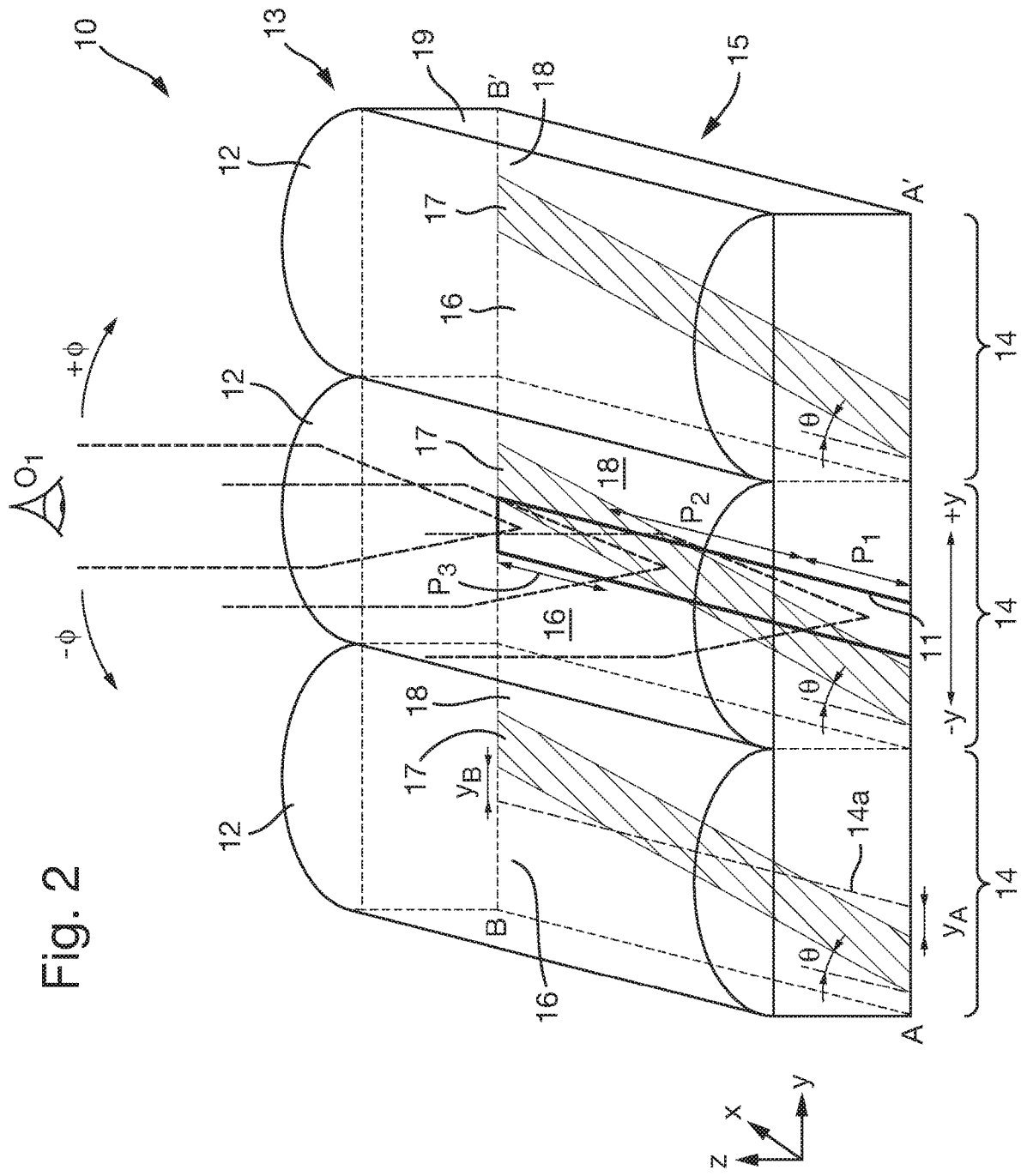
FIG. 2 is a perspective view of a portion of a security device in accordance with a first embodiment to the present invention.

FIG. 2 shows a perspective view of a security device in accordance with a first embodiment of the invention. The security device 10 is of substantially the same physical construction as that of the security device 1 described above, comprising an array 13 of cylindrical lenses 12 on a transparent substrate 19 having an image element array 15 located on the opposite side (or alternatively directly under the lenses 13). Again, the image element array 15 comprises a series of image slices of which three 16, 17 and 18 are arranged in each optical footprint 14. As before, for simplicity it is assumed that image slices 17 are representative of a "first" image, and image slices 16 and 18 correspond to a "second" or "background" image.

Unlike the comparative examples shown in FIG. 1, however, in the security device 10 of FIG. 2, the image slices 16, 17 and 18 are not parallel to the long axis of the lenses 12, i.e. to the first direction (X axis). Instead, the path of each image slice 16, 17, 18 is arranged such that the distance of each slice from a centre line 14a of its optical footprint, parallel to the X axis, changes (e.g. increases or decreases) with distance along the X axis. For instance, in the present example, at the first end A-A' of the security device 10, the image slice 17 has a distance $y_a$ from the centre line 14a of the optical footprint 14, whereas at the other end of the security device B-B', the same image slice 17 is now another distance $y_b$ from the centre line 14a of the optical footprint 14 (the magnitudes of $y_a$ and $y_b$ may be equal but in this case their directions are different). In the present example, this can also be denoted by an angle θ which each image slice makes with the axial direction of the lenses 12 (X axis), which angle will be non-zero and also non-orthogonal (i.e. less than 90 degrees).

FIG. 2 shows the area 11 of the optical footprint 14 which will be directed to the observer $O_1$ at an arbitrary viewing angle. This area 11 is defined by the geometry of the lenses 12 and hence will be an elongate strip-shaped area, parallel to the long axis of the lenses (i.e. to the X axis in this example). As such, at any one viewing angle, the area 11 is no longer coincident with one of the individual image strips 16, 17 and 18 (as in conventional devices), but rather will include portions of more than one image slice. Thus, in the example shown, a first portion $P_1$ of elongate strip 11 will primarily sample image slice 18, whilst a second portion $P_2$ will primarily sample image slice 17, and a third portion $P_3$ of the elongate strip 11 will primarily sample from image slice 16. Again, this will be the case for each lens of the array, although the light rays and elongate strip 11 which is directed to the viewer are only depicted in the Figure for one lens in order to improve clarity.

The result is that, across the whole device, different regions of the device laterally offset from one another along the first direction (X axis) will display different ones of the images simultaneously. A region of the device adjacent end A-A' will display the second or background image represented by image slices 18, whilst a central portion of the device along the X axis and in between positions A-A' and B-B' will display the first image represented by slice 17. At the same time, a third region of the device adjacent location B-B' will display the second or background image again, carried by image strips 16. It will be appreciated that if in practice the strips 16 and 18 were allocated to different respective images, this region would display a third different image. Any number of images can be incorporated into the device in this way.

As the device 10 is tilted around the X axis such that the viewing angle ϕ changes, different portions of the image slices 16, 17 and 18 will be sampled by the lenses 12 and this is illustrated in FIGS. 3a, b and c which show the same device 10 at three different viewing angles. In FIG. 3a, the device 10 is viewed at an angle $+\phi_m$, representing the maximum tilt position in one direction. The elongate strip 11 representing the area of the optical footprint 14 directed to the viewer by each lens is shown to be on the far left of each footprint and intersects the image slice 17 only in a first portion adjacent the end A-A' of the device. This will give rise to the first image being displayed by a first region of the device adjacent end A-A'. In FIG. 3b, the device 10 has been tilted such that it is now viewed along the normal (i.e. at a viewing angle ϕ of 0 degrees), and as such the elongate strip 11 which is directed to the viewer now intersects a central portion of image slice 17. Hence the first region of the device displaying the first image will now appear approximately half way along the device, between ends A-A' and B-B'. Upon further tilting to an angle $-\phi_m$, as shown in FIG. 3c, the elongate strip 11 which is now directed to the viewer has moved to the extreme right of each optical footprint and no longer intersects the image slice 17 at all in this example. Hence at this viewing position, the first image will not be displayed by any part of the device 10.

FIGS. 4a to 4e show schematic plan views of a device 10 constructed on the same principles as shown in FIGS. 2 and 3, at five different viewing angles ϕ. Again, for simplicity, it is assumed that the first image, carried by image slices 17 is a uniform coloured block image, e.g. black, whilst the second or background image carried by image slices 16 and 18 is uniform white or transparent. However, in practice, either or both images could be more complex as mentioned above. An example of this will be provided below.

Figure 4A:
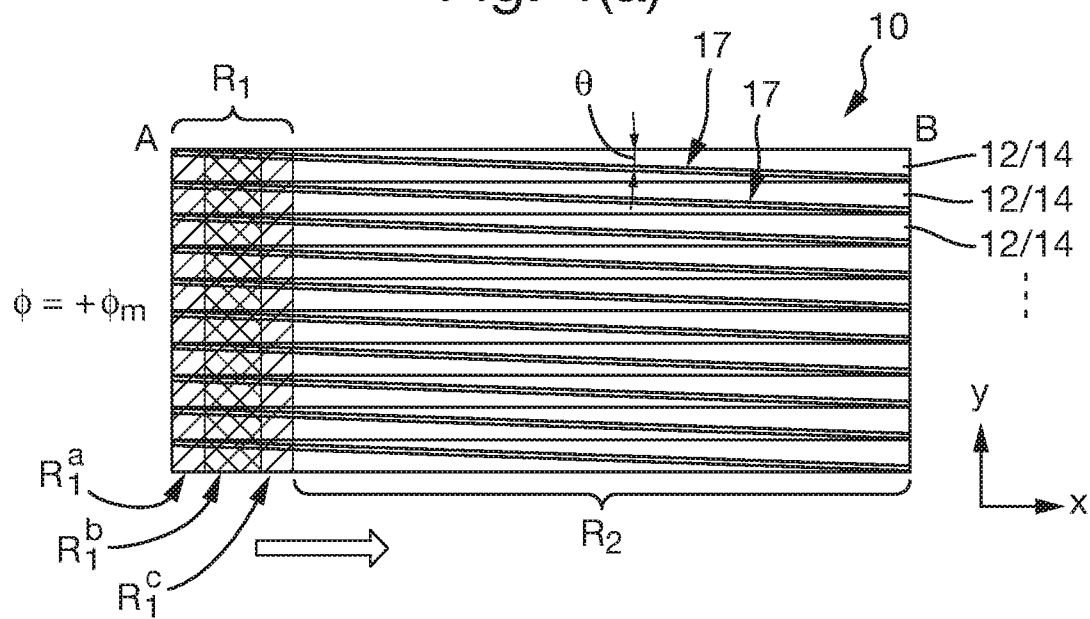
FIGS. 4a to 4e show schematic plan views of the security device of FIG. 2 at five different viewing angles.
Figure 4B:
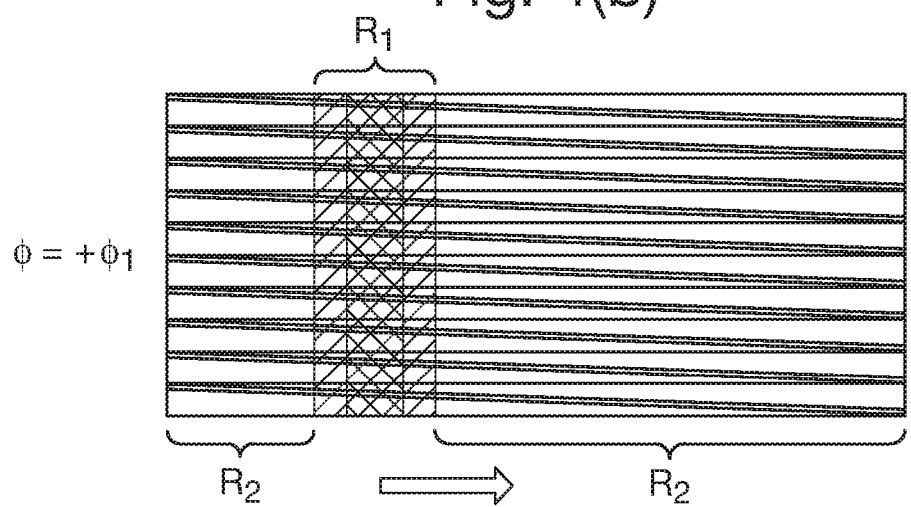

As shown in FIG. 4a, at a first viewing angle $+\phi_m$, representing the maximum viewing position in one tilt direction, each lens 12 is sampling an elongate strip running alongside the top of each optical footprint 14 with the result that image slices 17 are intersected only in a first region $R_1$ adjacent first end A-A' of the device. In this first region $R_1$, the device therefore displays the first image, i.e appears black or dark in this example. The remainder of the device 10 constitutes a second region $R_2$, in which the second image is displayed, i.e. appearing white or transparent in this case. It will be noted that the first region $R_1$ is depicted as having a central core region $R_1^b$ and outlying secondary (or "transition") regions $R_1^a$, $R_1^c$ along the X axis direction. This is because, as will be appreciated from an inspection of FIGS. 2 and 3, since the elongate strip 11 of the optical footprint which is sampled intersects the image slice 17 at an angle, the proportion of the sample strip 11 filled by the image slice 17 will vary along the X direction. As such, the first image will be displayed more strongly in a central portion $R_1^b$ of the region $R_1$, whilst there will be more "cross talk" with neighbouring image slices at the extremities of the region $R_1^a$, $R_1^c$; with the result that the first image will be displayed more faintly here (or some intermediate combination of the first and second images will be displayed).

As the device is tilted about the X axis such that the angle ϕ decreases to $+\phi_1$ (FIG. 4b), the sampled strip 11 of each optical footprint will move in the Y axis direction, with the result that the portions of the image slices 17 which are now sampled are further along the X axis direction. This gives the visual impression that the first region $R_1$ in which the first image is displayed has moved along the X axis direction. It should be noted that, in practice, if the first image is not a uniform block colour but contains information such as letters, numbers or a portrait or other graphic, it will be a different portion of that image which is now revealed by the first region in its new position. The actual data content of each image will not move but rather different portions of each image will be revealed as the regions move.

Figure 4C:
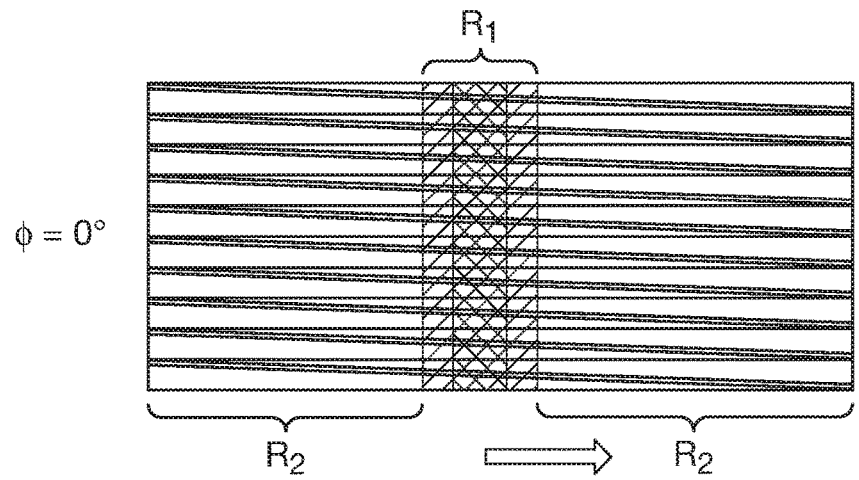
Figure 4D:
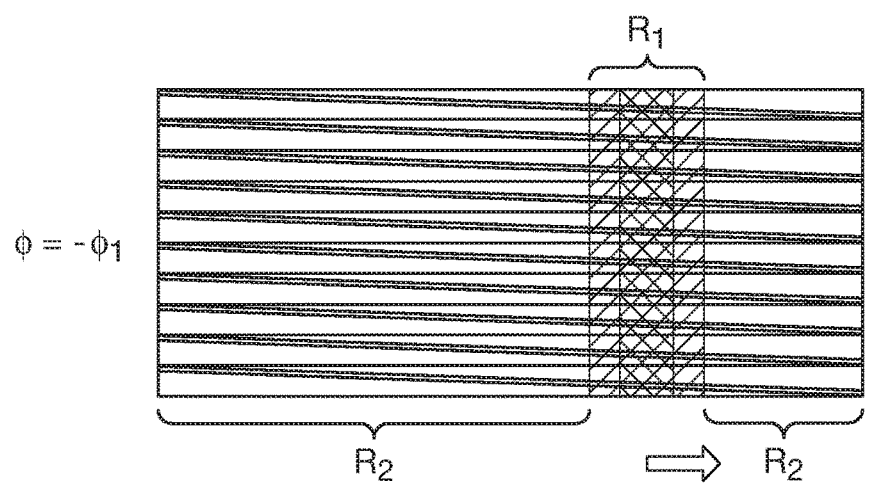
Figure 4E:
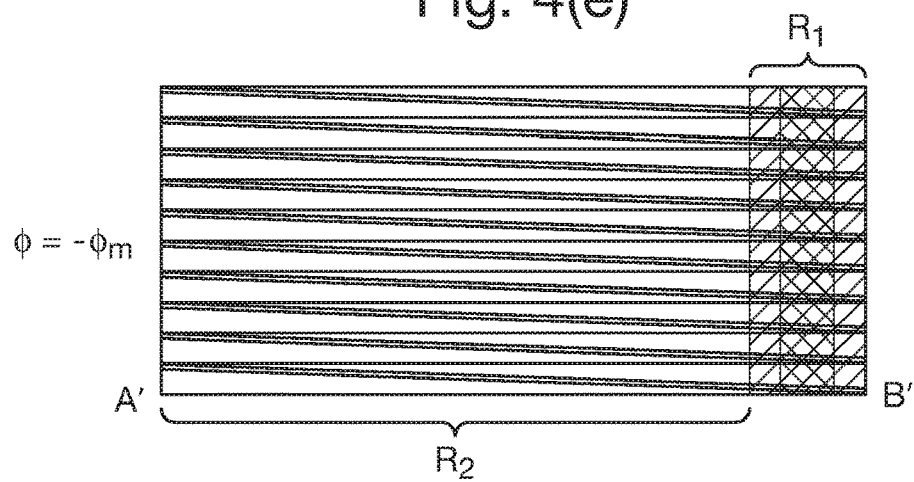

As tilt continues, the portions of image slices 17 which are sampled by the lenses continues to move along the device in the X axis direction giving the visual impression that the region $R_1$ moves gradually along the device in the X axis direction, as shown in FIGS. 4c, 4d and 4e.

In the present embodiment, the remainder of the device outside the first region $R_1$ will constitute a second region $R_2$ which displays the second image carried by image strips 16 and 18. For instance, in the present example, this region $R_2$ may be white or black. In other cases, the second image could carry information such as letters, number or any other graphics. However, more than two images could be provided by increasing the number of image slices provided in each optical footprint 14. Each image slice will be arranged at the same angle θ relative to the axial direction of the lenses, i.e. parallel to the image slices 17 representing the first image. A corresponding number of different regions, one displaying each image, will result along the device and all will move along the device in the same manner indicated in FIG. 4 upon tilting about the X axis.

Figure 5A:
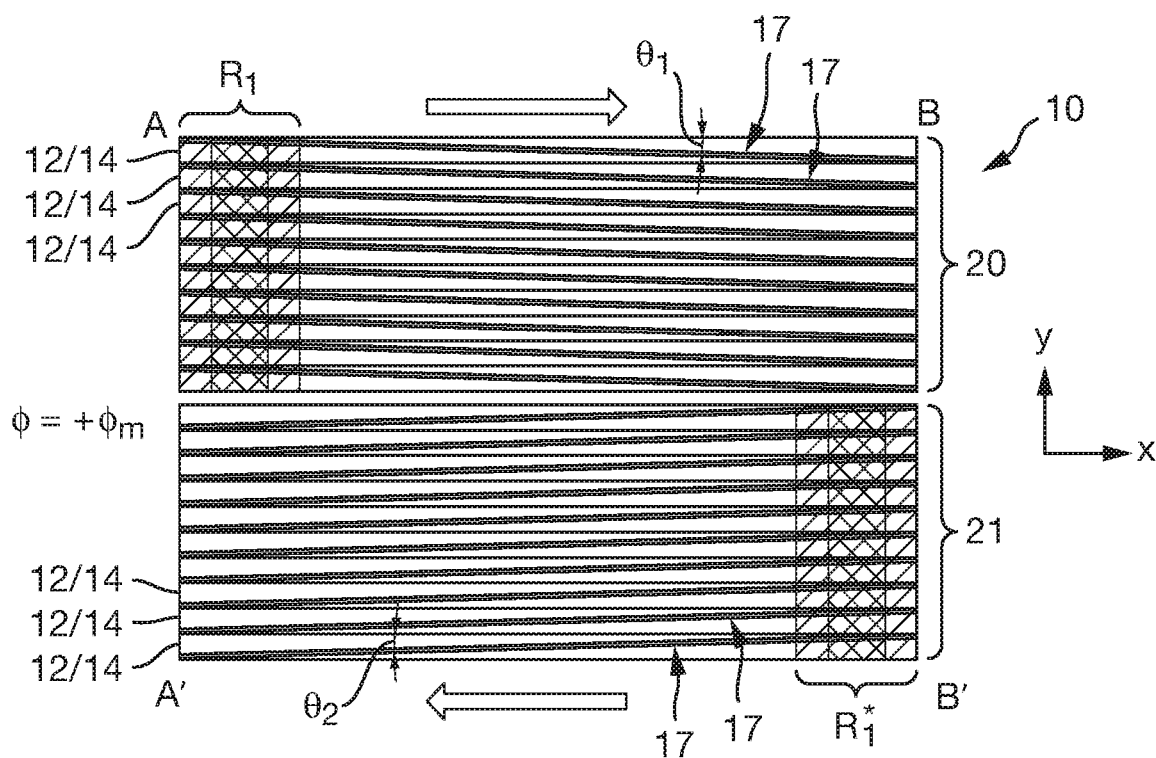
FIGS. 5a, 5b and 5c are schematic plan views of a security device in accordance with a second embodiment of the invention, at three different viewing angles.

FIG. 5 shows a second embodiment of a security device 10 in accordance with the present invention. The device is constructed based on the same principles as described with respect to FIGS. 2 to 4. However, in this case, the device is formed in two parts 20 and 21. The first part 20 is of the same construction as that of the device shown in FIGS. 2, 3 and 4, with the image slices 17 arranged an angle $\theta_1$ to the X axis. The angle $\theta_1$ is a positive angle meaning that the distance of each image slice 17 from the upper side of the optical footprint 14 in which it is disposed increases in the positive X axis direction. The second part 21 of the device 10 is of substantially the same construction, except that here the image slices 17 are arranged at an angle $\theta_2$ relative to the X axis which is negative. That is, the distance in the Y axis direction between the image slices 17 and the top side of its respective optical footprint 14 decreases in the X axis direction. The first and second parts 20 and 21 of the device 10 are laterally offset with one another in the Y axis direction but overlap one another (in this case exactly) in the X axis direction, as shown.

Figure 5B:
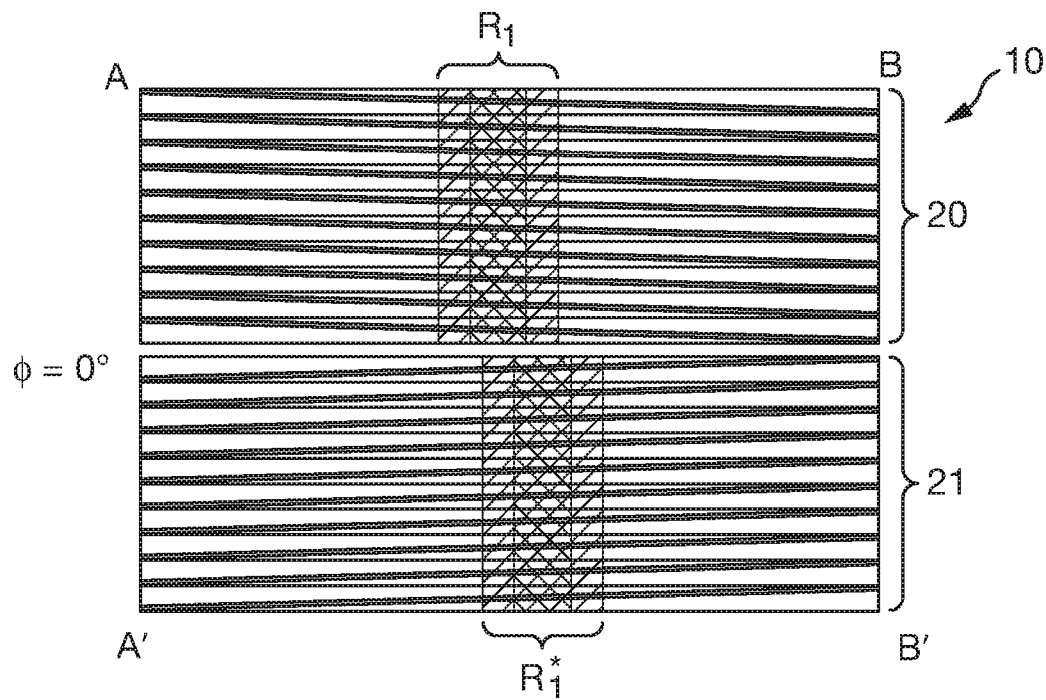
Figure 5C:
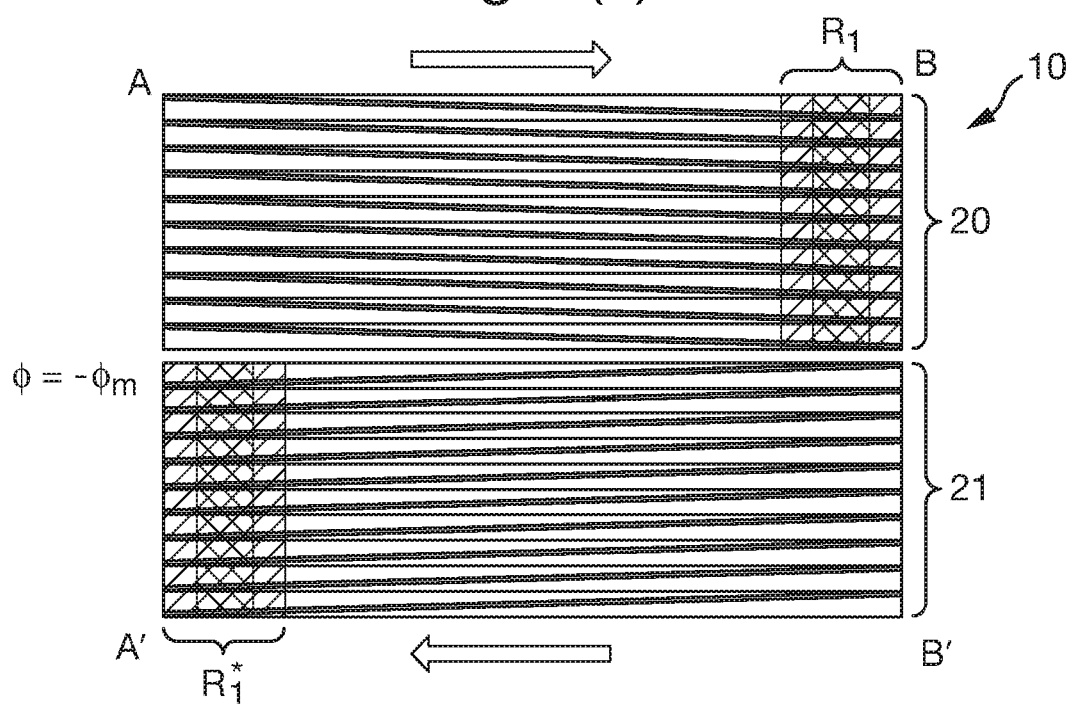

The different values of $\theta$ provided in the two parts 20 and 21 of the device give rise to different motion effects in the two parts of the device upon tilting. The first part 20 of the device behaves exactly as the device described with respect to the first embodiment, depicted in FIG. 4. That is, as the device is tilted about the X axis from a viewing angle $+\phi_m$, through 0 degrees (FIG. 5*b*) to viewing angle $-\phi_m$ (FIG. 5*c*), the first region $R_1$ displaying the first image (corresponding to image slices 17) moves from the first end A-A' of the device to the other end B-B' of the device, i.e. left to right as depicted in the Figure. At the same time, the second part 21 of the device 10 exhibits the opposite behaviour. That is, at the initial viewing angle $+\phi_m$, the first region $R_1^*$ is displayed at the second end B-B' of the device and, upon tilting through the viewing angle 0 (FIG. 5*b*) to viewing angle $-\phi_m$ (FIG. 5*c*), the region $R_1^*$ moves from the second end B-B' to the first end A-A' of the device, i.e. from right to left as depicted in the Figure. Thus, the two first regions $R_1$ and $R_1^*$ in the respective parts of the device 20 and 21 simultaneously move in opposite directions as the device is tilted about the X axis in either rotational sense. Due to the lateral arrangement of the two parts 20 and 21, the two first regions $R_1$ and $R_1^*$ appear to move past one another as shown in FIG. 5*b*, thereby extenuating the sense of motion exhibited by the device.

Whilst it is preferable that the image slices 17 in the first and second regions 20 and 21 exhibit the same first image, such that regions $R_1$ and $R_1^*$ both exhibit the same image as one another, this is not essential. The images displayed by each part of the device 20 and 21 could be different from one another.

Figure 6:
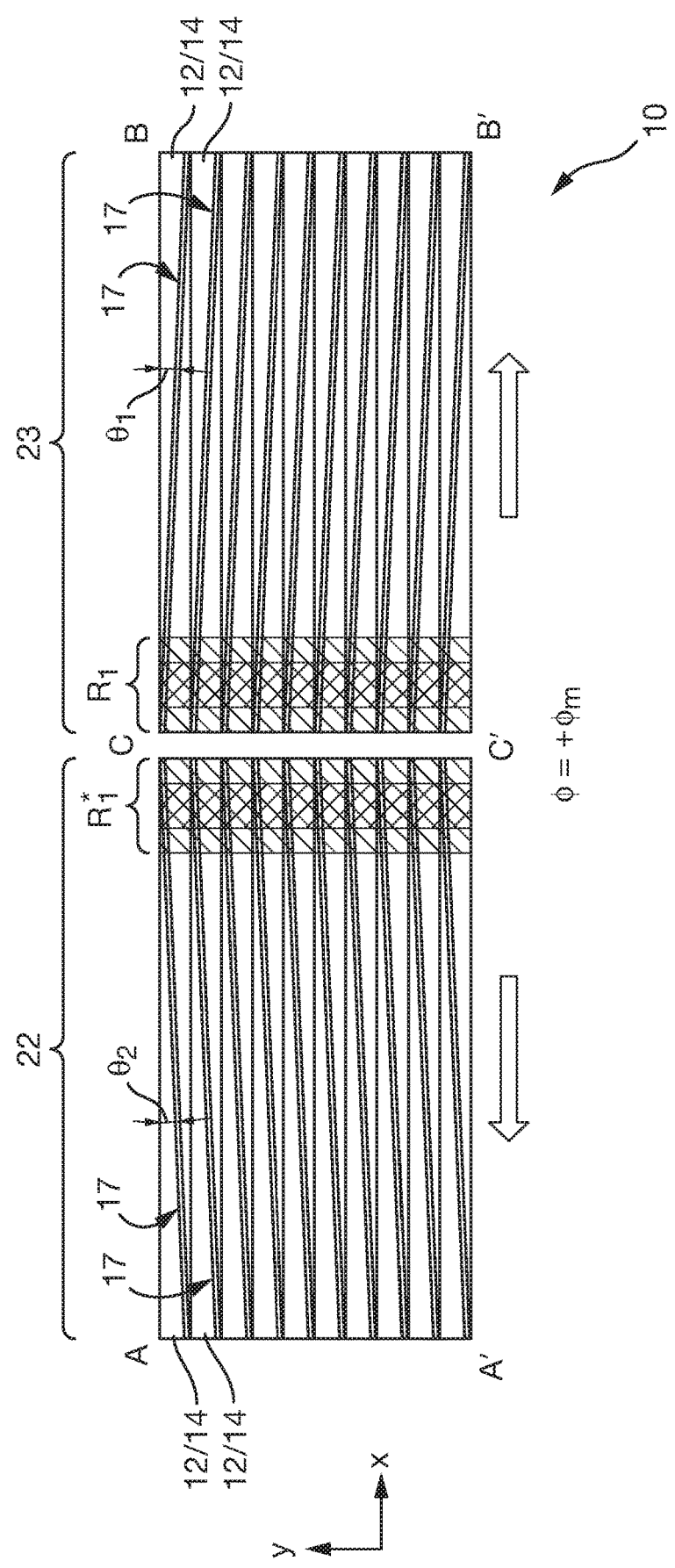
FIG. 6 is a schematic plan view of a security device in accordance with a third embodiment of the invention.

FIG. 6 shows a further example of a security device 10 in accordance with a third embodiment of the invention. Again, the security device 10 comprises two parts 22 and 23, laterally offset along the X axis direction but not along the Y axis direction, in which they overlap one another exactly. In practice the two parts 22 and 23 may preferably abut one another although are shown spaced apart for clarity. The first part 22 of the device 10 is of the same construction as part 21 of the device shown in FIG. 5, i.e. having a negative angle $\theta_2$ between the image slices 17 and the side of the optical footprint 14 in which they are placed. Meanwhile, the part 23 of the device 10 is of the same construction as part 20 of the device shown in FIG. 5, i.e. having a positive angle $\theta_1$ between the image slices 17 and the side of the respective optical footprint 14. Again, this has the result that first regions $R_1^*$ and $R_1$ of the two parts of the device will appear to move in opposite directions to one another along the X axis upon tilting the device about the X axis in either rotational sense. For example, FIG. 6 shows the device 10 viewed at an angle $+\phi_m$. Part 22 of the device 10 will exhibit its first region $R_1^*$ at its right-most end, adjacent position C-C' of the device and part 23 will exhibit its first region $R_1$ at its left-most end, which is also adjacent position C-C', i.e. the centre of the device 10. Upon tilting the device through viewing angle 0 to $-\phi_m$, the first regions will appear to move away from one another, region $R_1^*$ of part 22 moving to the end of the device marked A-A', and region $R_1$ of part 23 of the device 10 moving to the end marked B-B'. Again, this configuration enhances the sense of motion exhibited by the device upon tilting. If the two parts 22, 23 of the device 10 abut one another the movement effect will appear to emanate from a location inside the device 10, in this case at approximately its mid-point. A similar embodiment in which the image slices are curved rather than straight will be described below with respect to FIG. 17.

Figure 7:
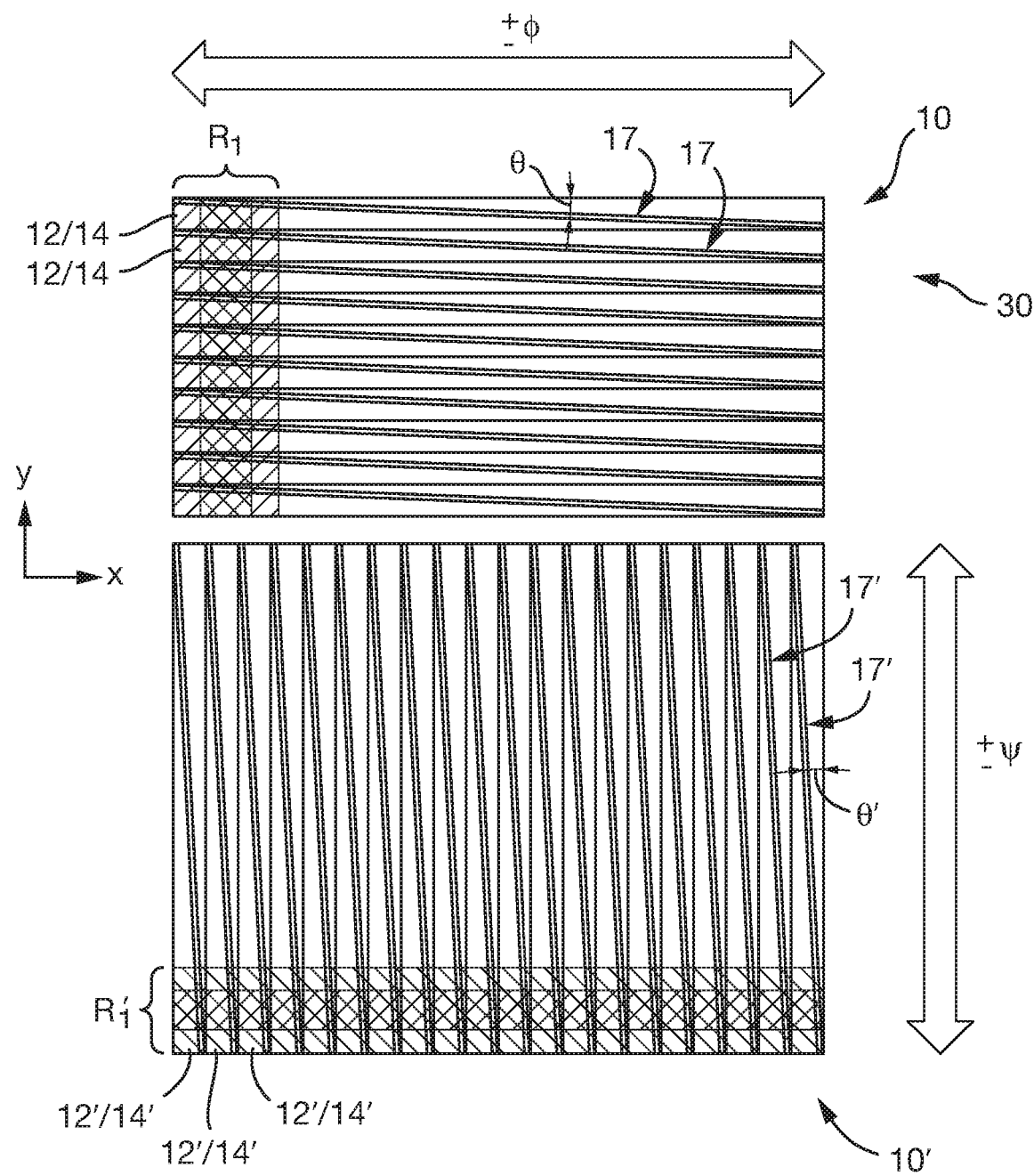
FIG. 7 is a schematic plan view of a security device assembly in accordance with an embodiment of the invention.

In the exemplary security devices described so far, all of the elongate focusing structures are single elongate focusing elements (lenses 12), aligned with their long axes along the X axis direction, which may be referred to as the first direction of the device. The above described effects will only be exhibited when the viewing angle changes in the orthogonal Y axis direction, e.g. by tilting the device about the X axis. If the device were to be tilted solely about the Y axis, no optically variable effect will be observed. FIG. 7 shows an example of a security device assembly 30 in accordance with an embodiment of the present invention which is configured to address this. The security device assembly comprises two devices 10 and 10', each of the sort described in the preceding embodiments. The first device 10 is configured with its focusing elements 12 aligned along the X axis as before and exhibits the same effects as already described with respect to FIG. 4. Meanwhile, the second security device 10' is laterally offset from the first security device 10 and comprises elongate focusing elements 12 which are aligned along a different direction from that of the first device. Here, the lenses 12 of device 10' are aligned along the Y axis and hence orthogonal to the focusing elements of the first device 10, as is preferred. Otherwise, the construction of the second device 10' is substantially the same as previously described, the image slices 17 being arranged at an angle $\theta'$ to the long axis direction of the focusing elements 12'. It will be appreciated that the angle $\theta'$ may or may not be equal to the angle $\theta$ in the first device 10 and similarly the dimensions of the lenses 12' and their corresponding optical footprints 14' may or may not be the same in the two devices.

When the security device assembly 30 is tilted about the X axis, the first device 10 will exhibit the same effect as previously described, with its first region $R_1$ appearing to move along the device in the X axis direction. Meanwhile, the security device 10' will appear static, displaying its first region $R_1'$ at a, fixed position which will depend on the viewing angle about the Y axis. If the security device assembly is then titled about the Y axis $(+/-\psi)$ and kept stationary about the X axis, now the first device 10 will appear static whilst the second security device 10' will exhibit movement based on the same principles as already described. That is, its first region $R_1'$ displaying its first image will appear to move along the Y axis direction. Hence security device assemblies of the sort shown in FIG. 7 have the advantage that, whichever direction the change in viewing angle takes place in, one or both of the security devices will exhibit a motion effect. It will be appreciated that any number of such security devices could be incorporated in the security device assembly 30, and at any relative angles from one another, although orthogonal arrangement such as that depicted are preferred.

Embodiments such as that shown in FIG. 7 also lend themselves well to the use of alternative focusing structure arrays. In particular, in place of the described arrays of elongate lenses 12, 12', a two-dimensional array of focusing elements such as spherical or apsherical lenses (examples of which will be described further below in relation to FIGS. 16 and 17) can be used which optionally may extend continuously over both devices 10, 10'. For example, if an orthogonal array of such focusing elements is provided in alignment with the x- and y-axes illustrated, one of its orthogonal axes (parallel to the y-axis) can be used as the first direction for the first device 10, and the other (parallel to the x-axis) can be used as the first direction for the second device 10'. Thus the two devices can be defined relative to one another solely by means of the image array, and particularly in terms of the different directions of the image slices 17, 17', without requiring any difference in the focusing element array between the two devices. This not only simplifies construction but also avoids any need for translational registration between the image element array and the focusing elements.

Figure 8A:
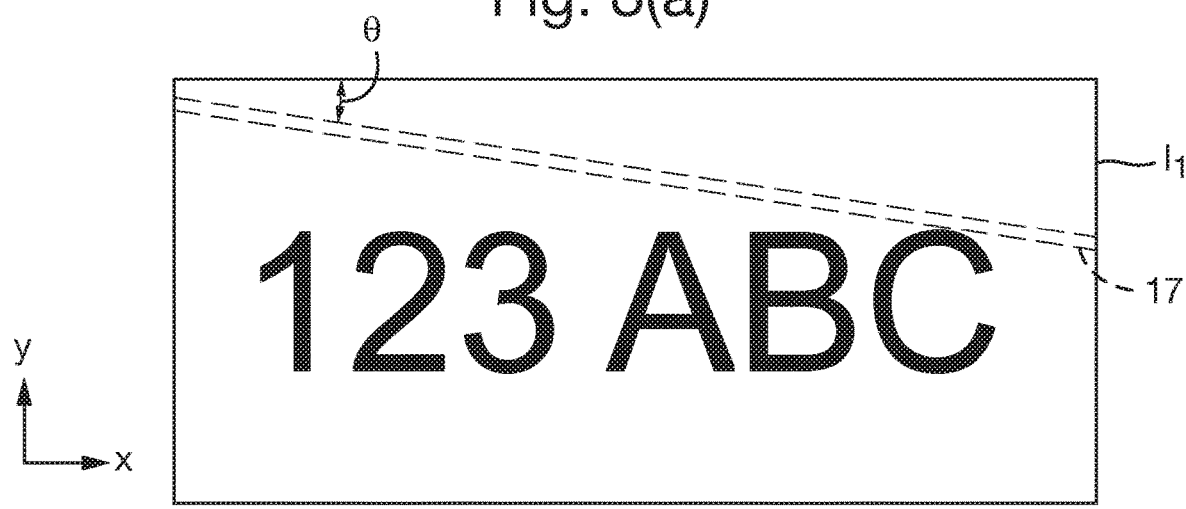
FIGS. 8a and 8b depict exemplary first and second images respectively as may be displayed by a security device.
Figure 8B:
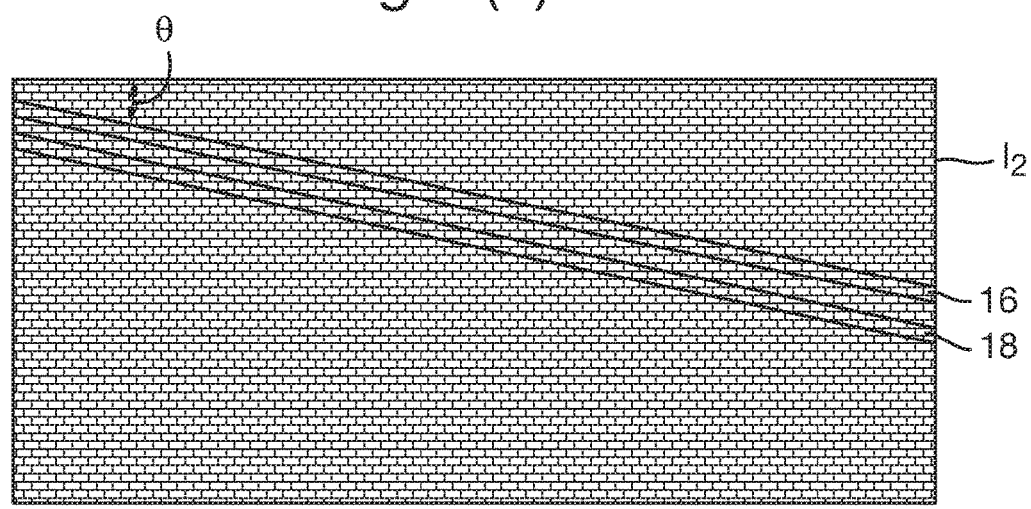

In the preceding examples, for simplicity the images displayed by the device have been solid colours such as black or white. In practice it may be desirable to display more complex images such as letters, numbers, logos, symbols, portraits, patterns or other graphics. An example of a security device 10 comprising more complex images such as these is depicted in FIG. 8. FIGS. 8a and 8b show the two images which are to be displayed by the device. It will be appreciated that FIGS. 8a and 8b show each respective image intact and not as it will ultimately be seen in the device. The first image $I_1$ (FIG. 8a) comprises a series of black numbers and letters "123 ABC" against a white background. To incorporate the image into the device, the image $I_1$ is divided into multiple image slices of which a single one 17 is shown purely for illustration. The image slice 17 is arranged at the same angle θ referenced in the previous discussion.

The second image $I_2$ shown in FIG. 8b is a relatively uniform line pattern continuing across the whole area of the device. Again, the second image $I_2$ is divided into a series of image slices 16 and 18 arranged at the same angle θ. To form the image element array 15 for the security device 10, selected image slices 17 from the first image $I_1$ are interspersed with selected image slices 16 and 18 from the second image $I_2$.

The appearance of the resulting security device 10 is shown in FIGS. 8c and 8d. At viewing angle $\phi_1$, shown in FIG. 8c, a first region $R_1$ of the device located near the centre of the device 10 along the X axis direction (corresponding to the long axes of the focusing elements 12) displays a portion of the first image. On each side of region $R_1$ along the X axis direction, in second regions $R_2$, portions of the second image $I_2$ are displayed. It will be seen that only a central portion of the first image $I_1$, showing the number 3 and partial letters AB are visible in the first region $R_1$, the remainder of the first image $I_1$ appearing to be concealed by portions of the line pattern of the second image $I_2$ in regions $R_2$ of the device.

When the security device 10 is tilted about the X axis to a different viewing angle $\phi_2$ as shown in FIG. 8d, the first region $R_1$ appears to move along the X axis as shown. Now, the first region $R_1$ reveals a different portion of the first image $I_1$ having the letters "ABC". On either side of the first region $R_1$, the second regions $R_2$ again display the second image $I_2$. Thus, the visual effect upon tilting is a "slide reveal" transition from one image to the other and vice versa.

As previously indicated, in practice any number of different images can be incorporated into the device by interlacing more than two corresponding sets of image slices, in which case each image will be displayed in a corresponding region of the device, all of which will appear to translate along the X axis of the device upon tilting.

In all embodiments, it is desirable to visually integrate the movement effect with at least one, preferably all, of the images which the device is configured to display. For example, the image(s) may include features which are aligned with the first direction, e.g. lines, chevrons or arrows, so that the direction of motion is reinforced by the directionality of the images themselves. Alternatively if the motion effect is configured to emanate from or towards a location inside the device (as in the FIGS. 6 and 17 embodiments) the image(s) may be configured to approximately identify that location, e.g. with indicia or by arranging the image(s) to be symmetrical about that location.

Relevant aspects of the geometry of the device will now be described with reference to FIG. 9 which shows a schematic plan view of an exemplary device based on constructions already discussed with respect to FIGS. 2 to 4.

Figure 9A:
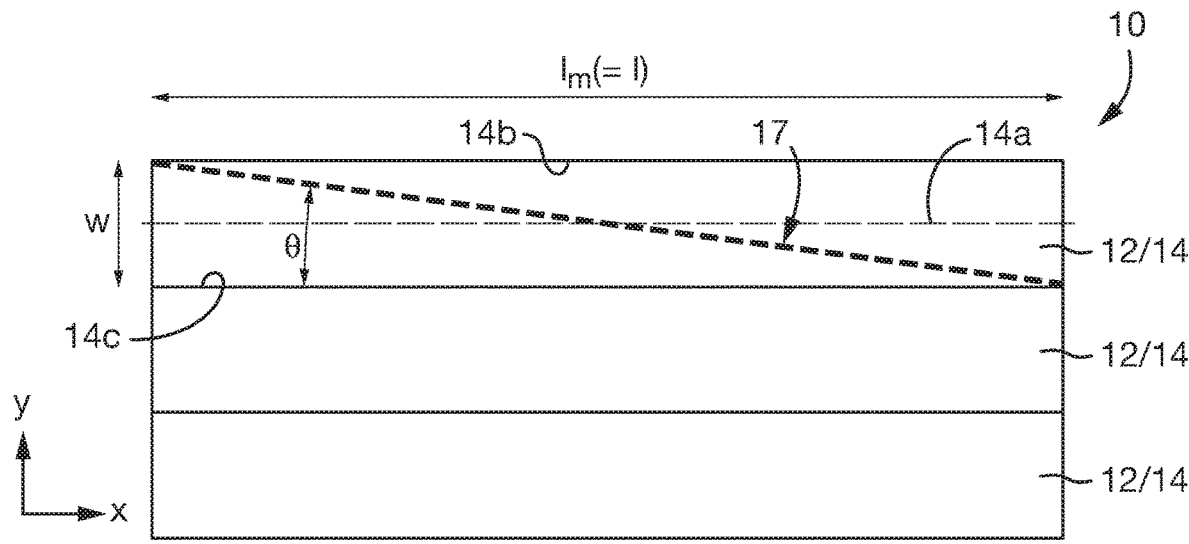
FIG. 9a shows a schematic plan view of a security device in accordance with an embodiment of the invention and FIG.

FIG. 9 shows an exemplary security device of which one image slice 17 is shown at an arbitrary angle θ to the long axes (corresponding to the centre line 14a) of the focusing elements 12, which here align with the X axis (first direction). The width of each focusing element 12 in the orthogonal direction (Y axis or second direction) is given by w. The focusing element's width w is approximately equal to that of the corresponding optical footprint 14. In the example depicted, the length l of the security device 10 in the first direction is equal to the maximum distance $I_m$ each region $R_1$, $R_2$ etc. will move along the device upon tilting. This corresponds to the distance in the X axis it takes for the image slice 17 to cross from one side 14b of the optical footprint to the other side 14c. From the diagram it will be appreciated that $I_m$ will depend on the selected value of θ and the focusing element width w. The movement distance $I_m$ is given by:

$$l_m = w/\tan\theta \qquad (1)$$

Figure 9B:
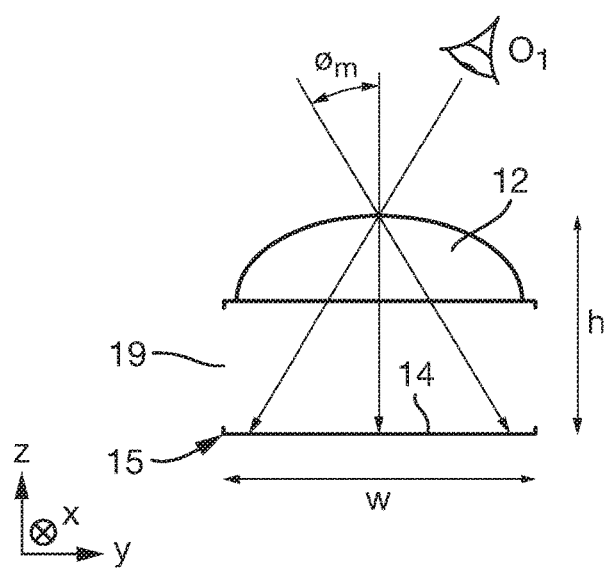

The other relevant angle is the maximum available viewing (tilt) angle and this is depicted as $\phi_m$ in FIG. 9b. Here, a single lens 12 and its optical footprint 14 are shown in cross-section along the X axis. The height h corresponds to the distance between the optical surface of the lens 12 and the plane in which the image array 15 lies (which preferably corresponds approximately to the focal plane of the lens, hence the height h is preferably approximately equal to the focal length of the lens). It will be seen from the diagram that the maximum viewing angle $\phi_m$ depends on the height h and the focusing element width w and is given by:

$$\tan\phi_m = \frac{w}{2h} \qquad (2)$$

In designing the device, one of the relevant factors will be the apparent "speed" with which each region appears to move along the device upon tilting—or more accurately, the distance the region will move per unit change in the viewing (tilt) angle. Too "fast" a movement will result in an effect which confuses the eye and prevents any of the image being clearly seen. On the other hand if the movement effect is very "slow", the device would require tilting to very high angles before it will be perceived at all. The "speed" of motion of the regions (or "rate of skew") is defined by the ratio dx/dφ, where x is the first direction and φ is the viewing angle in the orthogonal direction. This approximates to (assuming φ in radians):

$$\frac{dx}{d\Phi} = \frac{I_m}{2\Phi_m} \quad (3)$$

Which, substituting for $I_m$ using equation (1), gives:

$$\frac{dx}{d\Phi} = \frac{w}{2\Phi_m \tan\theta} \quad (4)$$

For small values of θ, tan θ≠θ and hence:

$$\frac{dx}{d\Phi} = \frac{w}{2\Phi_m \theta} \quad (5)$$

In one example, suppose the height h of the lens surface above the image element array is 35 microns, the width w of the lens is 30 microns and the image slices are arranged at an angle θ of 0.1 degrees (0.00175 radians). From equation (2), the maximum tilt angle $\Phi_m$ can be calculated as 23 degrees (0.4 radians). Applying equation (5), the "speed" of movement of the regions along the X axis (i.e. dx/dΦ) will be approximately 21 mm per radian tilt. The maximum distance travelled by each region as the device is tilted from +$\Phi_m$ to −$\Phi_m$ (i.e. $I_m$) is approximately 17 mm.

In another example, it may be desirable for the movement to just span the width of a security element such as a thread and the geometry of the device can be configured to achieve this. For example, if the thread has a width of 4 mm, the value $I_m$ should be set to the same. Assuming again a lens width w of 30 microns and height h of 35 microns, utilising equation (1) we get a value for θ of approximately 0.0075 radians (=0.2 degrees).

Preferred values of θ have been found to lie in the range 0.01 to 1 degree, preferably 0.01 to 0.5 degrees, more preferably 0.05 to 0.4 degrees, still preferably 0.1 to 0.3 degrees. Configurations in these ranges have been found to generate an acceptable "speed" of motion upon tilt as well as distance $I_m$.

In all of the examples given so far, each image slice 17 is configured as a single image element which continuously follows the desired path of the image slice. This is preferred in many cases since the resulting movement effect will be gradual and continuous along the length of the device. However, this is not essential and each image slice could in fact be made up of multiple discreet image elements. Some examples of security devices 10 based on this principle will now be described with reference to FIGS. 10, 11, 12 and 13.

Figure 10:
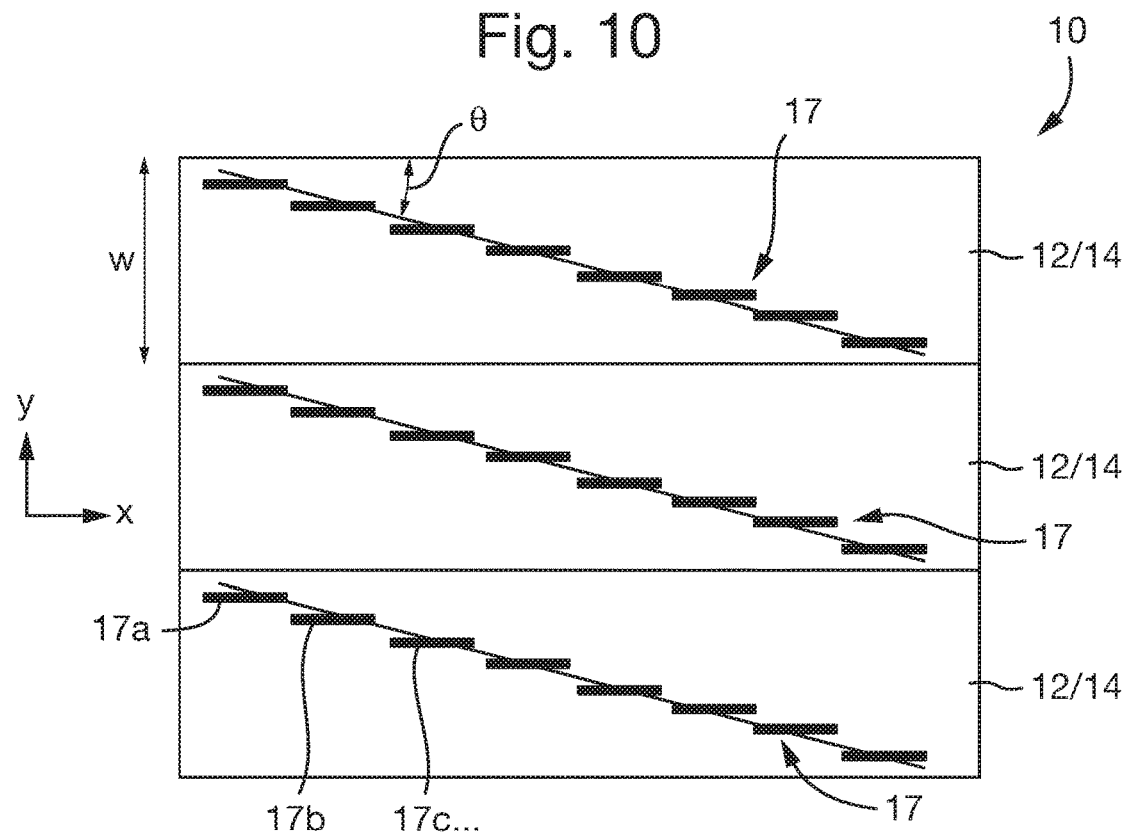

FIG. 10 shows a schematic plan view of an embodiment of a security device 10 in which each image slice 17 comprises a set of multiple image elements 17a, 17b, 17c, etc. Each individual image 17a, 17b, 17c is not aligned along the desired path of the image slice 17 and in this example is parallel to the long axis of the focusing elements (i.e. the X axis), which is preferred but not essential. The image elements 17a, 17b, 17c, etc. are located at staggered positions along the X and Y axes so together they are arranged along the desired path of the image slice 17. For example, the path may be approximated by a line drawn through the centre of each image element 17a, 17b, 17c, etc. (as shown). In this case, the path of the image slice 17 is straight, sitting at a constant angle θ to the first direction of the device, as in each of the preceding embodiments. The depicted arrangement will give rise to substantially the same visual effect as described previously with respect to FIGS. 2 to 4. However, due to the discreet nature of the image elements making up the image slice 17, the movement effect will appear less smooth with the first region in which the image corresponding to image slice 17 is displayed appearing to move in steps along the X axis of the device rather than continuously. Nonetheless, this can be desirable depending on the design of the device.

Figure 11:
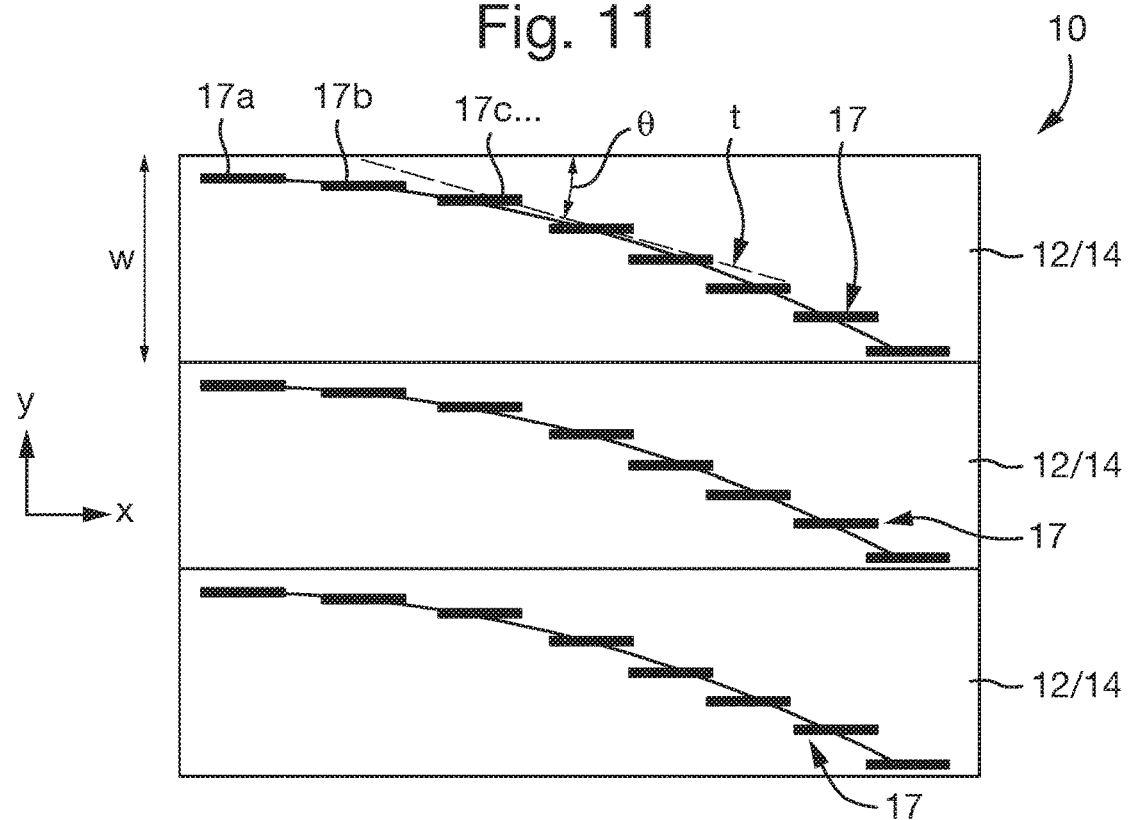
Figure 12:
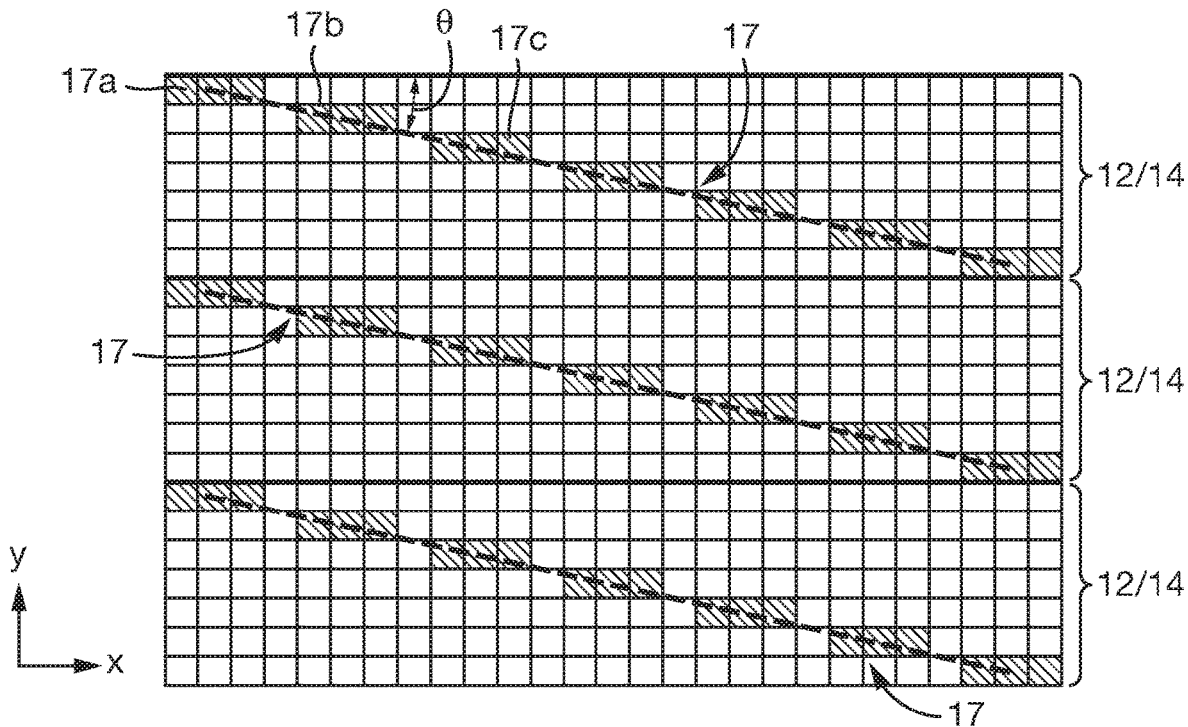

FIG. 11 shows a schematic plan view of a further embodiment of a security device 10 in which each image slice 17 is again made up of a set of multiple image elements 17a, 17b, 17c, etc. In this case, the image elements 17a, 17b, 17c are arranged along a path which is curved rather than straight. The distance between neighbouring image elements in the X axis direction decreases from the left to the right of the device whilst increasing in the orthogonal Y axis direction. Effectively, the angle θ (measured between the tangent to the path 17 at any one point and the X axis) increases from the left to the right of the device. Curved image slice paths such as this have the result that the apparent speed of motion of the regions (dx/dΦ) will vary as the regions progress along the device. In this example, the speed of motion in the X axis direction will appear to slow as the regions move from left to right along the device (and vice versa). Conversely, if the curved path is arranged such that the value of θ decreases from left to right, the regions will appear to accelerate as motion proceeds in the same direction. It will be appreciated that image slices formed of single elongate image elements (as in FIGS. 2 to 9) can also be curved in order to obtain a variation in speed of motion along the device, applying the same principles.

Where the image slices are formed of multiple image elements, the image elements are preferably arranged on a regular grid, e.g. an orthogonal grid, and an example of this is shown in the embodiment of FIG. 12. In this case the image elements are approximately square and arranged in a orthogonal grid, the axes of which are parallel to the first and second directions of the device (i.e. X and Y axes). Only the elements 17a, 17b, 17c etc. making up one image slice 17 in each optical footprint 14 have been shaded in the Figure for clarity but in practice the remaining image elements will be allocated to respective image slices from other images, the allocation of elements to each image slices continuing parallel to that shown. This device will produce the same effects already described with respect to FIG. 10.

Figure 13:
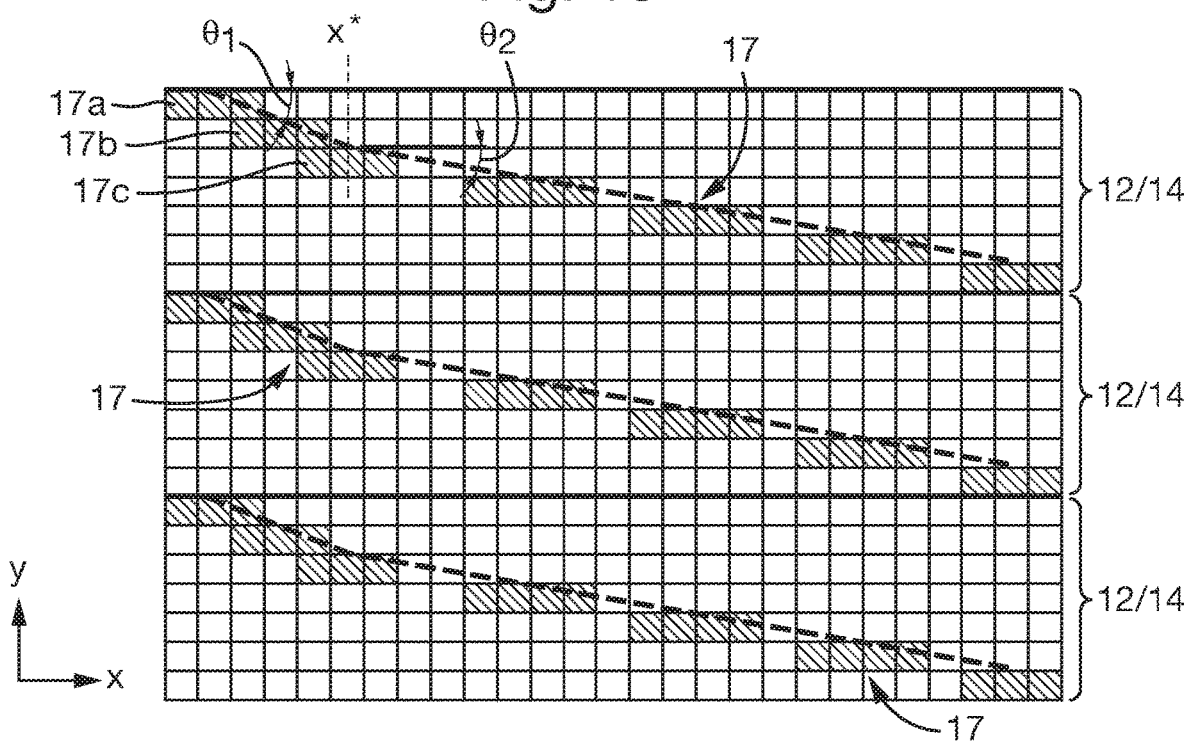

FIG. 13 shows a further example where the image slices 17 are formed from image elements arranged on a grid and in this case, like that of FIG. 11, the effective value of θ varies across the device. However, in this case, rather than being curved, the path of image element 17 (represented by the dashed line) is formed of two straight line segments: a first up to position x* having an angle $θ_1$, and a second beyond x at a smaller angle $θ_2$. Hence the apparent speed of motion will be constant until the region reaches position x* and then increase to a faster, constant speed across the rest of the device. Any number of line segments could be used. Again, the same effect could be achieved using a continuous elongate image element to represent the image slice, the direction of which changes along the length of the device.

In the above-described examples, the actual length (l) of the device in the first direction (X axis) has been equal to the maximum movement distance $I_m$. This is preferred in many cases since the regions of the device will then appear to move along its full length as the device is tilted through its maximum range of viewing angles. In other cases, the actual length of the device could be less than the maximum movement distance $I_m$, although this will prevent the full range of motion being visualised. In still further examples, an enhanced visual effect may be achieved by arranging the length I of the device to be greater than the maximum movement distance $I_m$. This corresponds to the requirement that each image slice 17 will intersect the optical footprints of at least two of the focusing elements, as shown in FIG. 14. Here, the length of the device is $2I_m$, such that each image slice 17 crosses the width of two optical footprints along the full length of the device. This has the result that multiple first regions $R_1$, each displaying a portion of the first image corresponding to image slices 17, are displayed along the device. An example of the resulting visual effect is shown in FIG. 15, which utilises the same first and second images $I_1$ and $I_2$ as in the FIG. 8 embodiment. At one viewing angle $\Phi_1$ (FIG. 15a), two first regions $R_1$ are displayed, one displaying the number "2" and part of the number "3", and the other showing the letter "B" and part of the letter "C". The two first regions are spaced from each other along the first direction of the device and the remainder of the device corresponds to multiple second regions $R_2$ all displaying portions of the second image. It will be appreciated that if more than two images are included in the device (via corresponding image slices), a corresponding number of different regions will be displayed, e.g. two "second" regions $R_2$, two "third" regions $R_3$ and so on.

Upon tilting about the X axis, all of the regions will move along the X axis in the same manner as previously described. FIG. 15b shows the device at a second tilt angle $\Phi_2$ and it will be seen that the two first regions $R_1$ have moved along the X axis towards the right of the device, such that now only part of the number "2" and the complete number "3" is shown in one, and only part of the letter "B" and all of the letter "C" is visible in the other. The second regions $R_2$ have also moved along the device to the same extent.

The result gives the visual impression of a "shutter" transition between the various images.

It will be appreciated that this implementation can be combined with any of the variations described previously, including curved image slice paths or those made of multiple straight line segments. In such cases, the variation in θ could take place anywhere along the length of the device and need not occur in every portion $I_m$ of the device.

As mentioned at the outset, whilst in the embodiments described so far, the elongate focusing structures have been implemented as elongate lenses (e.g. cylindrical lenses), this is not essential. In all of the above embodiments, the array of elongate lenses 12 could be replaced by a two-dimensional array of focusing elements which need not be elongate but could for example be spherical or aspherical. Effectively, a plurality of the focusing elements in the array arranged along a straight line performs the same function as each of the elongate lenses described above. To illustrate this, FIGS. 16(a) and (b) depict two exemplary focusing element arrays which could be used in any of the presently disclosed embodiments and will achieve substantially the same visual effects already described.

FIG. 16(a) shows an array of elongate focusing structures which comprises an orthogonal (square or rectangular) array of focusing elements, e.g. spherical lenses. Each column of lenses arranged along a straight line parallel to the x-axis is considered to constitute one elongate focusing structure 12 and dashed lines delimiting one elongate focusing structure 12 from the next have been inserted to aid visualisation of this. Hence for example the lenses 12a, 12b, 12c and 12d, the centre points of which are all aligned along a straight line, form one elongate focusing structure 12. These elongate focusing structures 12 are periodic along the orthogonal direction (y-axis) in the same way as previously described. The first direction (along which the above-described motion effect will take place) can then be defined along the arrow $D_1$, which here is parallel to the x-axis, and the image slices (not shown) will be arranged at the desired angle θ to that direction $D_1$. The optical footprint of each elongate focusing structure 12 will still be substantially strip shaped but may not be precisely rectangular due to its dependence on the shape of the lenses themselves. As a result the sides of the optical footprint may not be straight but the centre line 14a (defined as the line joining the points equidistant from the two sides of the footprint at each location) will straight and parallel to the first direction $D_1$.

Of course, since the grid of focusing elements is orthogonal, the first direction could be defined in the orthogonal direction $D_2$, in which case each row of lenses along the y-axis would be considered to make up the respective elongate focusing structures.

FIG. 16(b) shows another array of elongate focusing structures which here comprises a hexagonal (or "close-packed") array of focusing elements such as spherical lenses. Again the columns of adjacent lenses such as 12a, 12b, 12c and 12d are taken to form the respective elongate focusing structures (aligned along the x-axis) and those structures are periodic along the orthogonal direction (y-axis). Hence the direction $D_1$ can be defined as the first direction with the image slices (not shown) arranged at the desired angle θ to it. However it is also possible to define the direction $D_2$ (which here lies at 60 degrees from $D_1$) as the first direction. It should be noted that the y-axis direction is not suitable in this case for use as the first direction since the adjacent lenses do not all have their centre points on the same straight line in this direction.

As discussed in relation to FIG. 7 above, focusing element arrays such as these are particularly well suited to designs in which different parts of the device (or different adjacent devices) are configured to operate upon tilting in different directions. This can be achieved for example by using direction $D_1$ as the first direction in a first part of the device (or in a first device) and using direction $D_2$ as the first direction in a second part of the device (or in a second device).

Another example of a security device 10 is illustrated in plan view in FIG. 17. In this case the Figure shows the full image array 15 as it will be printed or otherwise formed on the device substrate. It will be appreciated that this is not what will be visualised when the complete device is viewed with the benefit of the focusing element array. In this case the focusing structures comprise lines of spherical or aspherical elements 12a, 12b . . . 12y, 12z, of which only selected elements are shown for clarity (in practice the array of focusing elements will extend right across the device 10). Here the focusing elements are arranged on an orthogonal grid but as mentioned above this could be hexagonal. Elongate elements such as cylindrical lenses could be used instead as in the earlier embodiments.

In this example, the first image (corresponding to image slices 16) comprises a black digit "5" on a white background. The second image (corresponding to images slices 17) comprises a white digit "5" on a black background. The digit "5" is at the same location in both images so the two are effectively negative versions of one another. The image slices 16, 17 are curved relative to the first direction, which here corresponds to the x-axis. The sense of curvature changes at the line M-M', which here denotes the midpoint of the device (although could be at any other location). Hence in a first part of the device between line A-A' and line M-M', the angle θ between the image slice and the first direction gradually decreases from a maximum value at line A-A' to approximately zero at line M-M'. In a second part of the device, from line M-M' towards B-B', the angle θ gradually increases once again. Hence upon tilting, the device will display a moving transition between the first and second image which appears to emanate from (or converge towards) the line M-M'. In this respect the device is similar to that discussed above with respect to FIG. 6, although the curved nature of the image slices here will additionally lead to an acceleration/deceleration effect as the transition band move across the device. The end result may be a combination of "sweeping" and "expansion" visual effects.

Figure 18:
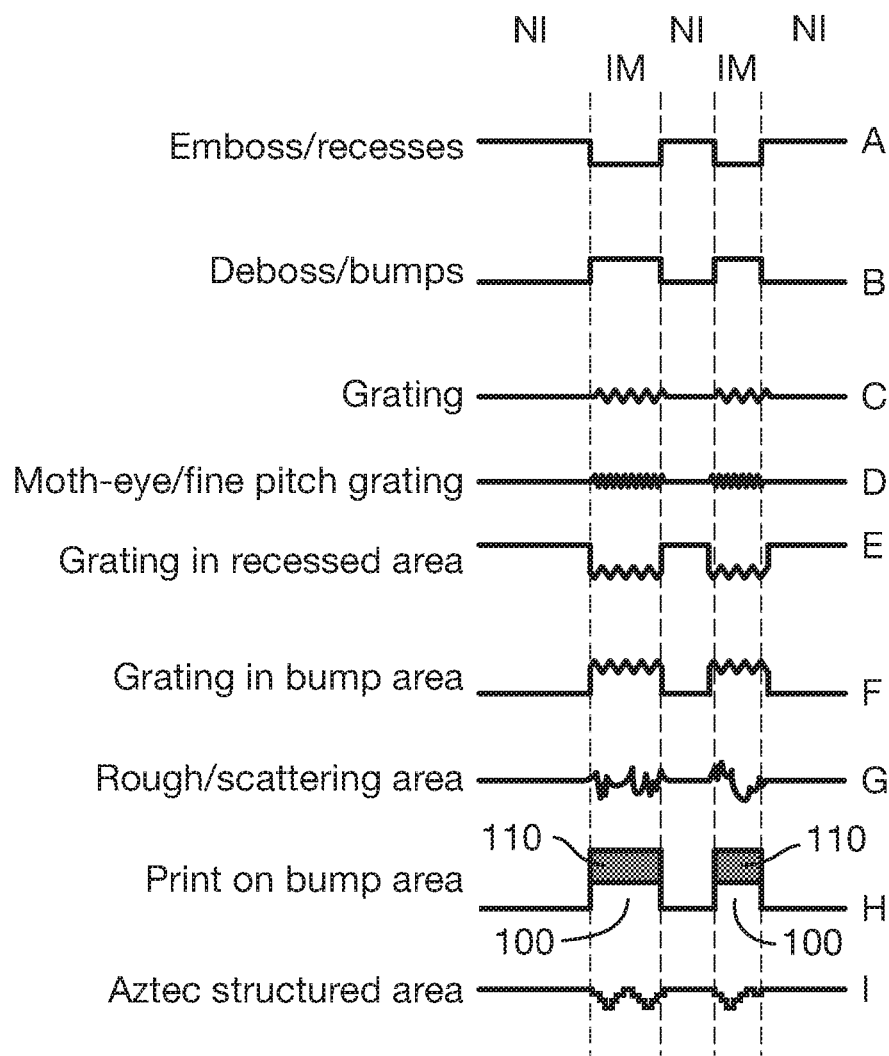

In all of the above examples, the image elements could be formed in various different ways. For example, the image elements could be formed of ink, for example printed onto the substrate 19 or onto an underlying layer which is then positioned adjacent to the substrate 19. In preferred examples, a magnetic and/or conductive ink could be used for this purpose which will introduce an additional testable security feature to the device. However, in other examples the image elements can be formed by a relief structure and a variety of different relief structure suitable for this are shown in FIG. 18. Thus, FIG. 18*a* illustrates image regions of the image elements (IM), e.g. the shaded image elements 17 which form the first, solid dark image in FIGS. 2 to 4, in the form of embossed or recessed regions while the non-embossed portions correspond to the non-imaged regions of the elements (NI), e.g. the unshaded image elements 16, 18. FIG. 18*b* illustrates image regions of the elements in the form of debossed lines or bumps.

In another approach, the relief structures can be in the form of diffraction gratings (FIG. 18*c*) or moth eye/fine pitch gratings (FIG. 18*d*). Where the image elements are formed by diffraction gratings, then different image portions of an image (within one image element or in different elements) can be formed by gratings with different characteristics. The difference may be in the pitch of the grating or rotation. This can be used to achieve a multi-colour diffractive image which will also exhibit a lenticular optical effect such as an animation through the mechanism described above. For example, if the image elements 17*a*, 17*b*, 17*c* creating the first image of FIG. 10 had been created by writing different diffraction tracks for each element, then as the device in FIG. 10 is tilted, lenticular transition from one image to another will occur as described above, as the region $R_1$ displaying the first image carried by slices 17 moves, its colour will also progressively change due to the different diffraction gratings. Different diffraction gratings could also be used to produce the colour contrast described between image slice 17 and image slices 16/18 in relation to the FIG. 2 embodiment. A preferred method for writing such a grating would be to use electron beam writing techniques or dot matrix techniques.

Such diffraction gratings for moth eye/fine pitch gratings can also be located on recesses or bumps such as those of FIGS. 18*a* and *b,* as shown in FIGS. 18*e* and *f* respectively.

FIG. 18*g* illustrates the use of a simple scattering structure providing an achromatic effect.

Further, in some cases the recesses of FIG. 18*a* could be provided with an ink or the debossed regions or bumps in FIG. 18*b* could be provided with an ink. The latter is shown in FIG. 18*h* where ink layers 110 are provided on the bumps 100. Thus the image areas of each image element could be created by forming appropriate raised regions or bumps in a resin layer provided on a transparent substrate such as item 19 shown in FIG. 2. This could be achieved for example by cast curing or embossing. A coloured ink is then transferred onto the raised regions typically using a lithographic, flexographic or gravure process. In some examples, some image elements could be printed with one colour and other image elements could be printed with a second colour. In this manner either the various different images incorporated in the device could be of different colours to one another and/or, when the device is tilted to create the motion effect described above, the individual images could also be seen to change colour as the regions move along the device. In another example all of the image elements in one portion of the device could be provided in one colour and then all in a different colour in another portion of the device. Again, magnetic and/or conductive ink(s) could be utilised.

Finally, FIG. 18*i* illustrates the use of an Aztec structure.

Additionally, image and non-image areas could be defined by a combination of different element types, e.g. the image areas could be formed from moth eye structures whilst the non-image areas could be formed from gratings. Alternatively, the image and non-image areas could even be formed by gratings of different pitch or orientation.

Where the image elements are formed solely of grating or moth-eye type structures, the relief depth will typically be in the range 0.05 microns to 0.5 microns. For structures such as those shown in FIGS. 18*a, b, e, f, h* and *i,* the height or depth of the bumps/recesses is preferably in the range 0.5 to 10 μm and more preferably in the range of 1 to 2 μm. The typical width of the bumps or recesses will be defined by the nature of the artwork but will typically be less than 100 μm, more preferably less than 50 μm and even more preferably less than 25 μm. The size of the image elements and therefore the size of the bumps or recesses will be dependent on factors including the type of optical effect required, the size of the focusing elements and the desired device thickness. For example if the width of the focusing elements is 30 μm then each image element may be around 15 μm wide or less. Alternatively for a smooth animation effect it is preferable to have as many views as possible, typically at least three but ideally as many as thirty. In this case the size of the elements (and associated bumps or recesses) should be in the range 0.1 to 6 μm. In theory, there is no limit as to the number of image elements which can be included but in practice as the number increases, the resolution of the displayed images will decrease, since an ever decreasing proportion of the devices surface area is available for the display of each image.

In practice, however the image elements are formed, the width of the image elements is directly influenced by two factors, namely the pitch of the focusing element (e.g. lens) array and the number of image elements required within each lens pitch or lens base width. The former however is also indirectly determined by the thickness of the lenticular device. This is because the focal length for a plano-convex lens array (assuming the convex part of the lens is bounded by air and not a varnish) is approximated by the expression $r/(n-1)$, where r is the radius of curvature and n the refractive index of the lens resin. Since the latter has a value typically between 1.45 and 1.5 then we may say the lens focal length approximates to 2r (=w). Now for an array of adjacent cylindrical lenses, the base width of the lens is only slightly smaller than the lens pitch, and since the maximum value the base diameter can have is 2r, it then follows that the maximum value for the lens pitch is close to the value 2r which closely approximates to the lens focal length and therefore the device thickness.

To give an example, for a security thread component as may be incorporated into a banknote, the thickness of the lenticular structure and therefore the lens focal length is desirably less than 35 μm. Let us suppose we target a thickness and hence a focal length of 30 μm. The maximum base width w we can have is from the previous discussion equal to 2r which closely approximates to the lens focal length of 30 μm. In this scenario the f-number, which equals (focal length/lens base diameter), is very close to 1. The lens pitch can be chosen to have a value only a few μm greater than the lens width—let us choose a value of 32 μm for the lens pitch. It therefore follows for a two channel lenticular device (i.e. two image element slices per unit cell) we need to fit two image strips into 32 μm and therefore each strip is 16 μm wide. Such a strip or line width is already well below the resolution of conventional web-based printing techniques such as flexo-graphic, lithographic (wet, waterless & UV) or gravure, which even within the security printing industry have proven print resolutions down to the 50 to 35 μm level at best. Similarly for a four channel lenticular the problem of print resolution becomes more severe as the printed line width requirement drops down to 8 μm (in this example), and so on.

As a result, for ink based printing of the image elements, the f-number of the lens should preferably be minimised, in order to maximise the lens base diameter for a given structure thickness. For example suppose we choose a higher f-number of 3, consequently the lens base width will be 30/3 or 10 μm. Such a lens will be at the boundary of diffractive and refractive physics—however, even if we still consider it to be primarily a diffractive device then the we may assume a lens pitch of say 12 μm. Consider once again the case of a two channel device, now we will need to print an image strip of only 6 μm and for a four channel device a strip width of only 3 μm. Conventional printing techniques will generally not be adequate to achieve such high resolution. However, suitable methods for forming the image elements include those described in WO-A-2008/000350, WO-A-2011/102800 and EP-A-2460667.

This is also where using a diffractive structure to provide the image strips provides a major resolution advantage: although ink-based printing is generally preferred for reflective contrast and light source invariance, techniques such as modern e-beam lithography can be used generate to originate diffractive image strips down to widths of 1 μm or less and such ultra-high resolution structures can be efficiently replicated using UV cast cure techniques.

As mentioned above, the thickness of the device 10 is directly related to the size of the focusing elements and so the optical geometry must be taken into account when selecting the thickness of the transparent layer 19. In preferred examples the device thickness is in the range 5 to 200 microns. "Thick" devices at the upper end of this range are suitable for incorporation into documents such as identification cards and drivers licences, as well as into labels and similar. For documents such as banknotes, thinner devices are desired as mentioned above. At the lower end of the range, the limit is set by diffraction effects that arise as the focusing element diameter reduces: e.g. lenses of less than 10 micron base width (hence focal length approximately 10 microns) and more especially less than 5 microns (focal length approximately 5 microns) will tend to suffer from such effects. Therefore the limiting thickness of such structures is believed to lie between about 5 and 10 microns.

In the case of relief structures forming the image elements, these will preferably be embossed or cast cured into a suitable resin layer on the opposite side of the substrate 19 to the lens array 13. The lens array 13 itself can also be made using cast cure or embossing processes, or could be printed using suitable transparent substances as described in U.S. Pat. No. 6,856,462. The periodicity and therefore maximum base width of the focusing elements 12 is preferably in the range 5 to 200 μm, more preferably 10 to 60 μm and even more preferably 20 to 40 μm. The f number for the focusing elements is preferably in the range 0.25 1 to 16 and more preferably 0.5 to 24.

Whilst in the above embodiments, the focusing elements have taken the form of lenses, in all cases these could be substituted by an array of focusing mirror elements. Suitable mirrors could be formed for example by applying a reflective layer such as a suitable metal to the cast-cured or embossed lens relief structure. In embodiments making use of mirrors, the image element array should be semi-transparent, e.g. having a sufficiently low fill factor to allow light to reach the mirrors and then reflect back through the gaps between the image elements. For example, the fill factor would need to be less than $1/\sqrt{2}$ in order that that at least 50% of the incident light is reflected back to the observer on two passes through the image element array.

In all of the embodiments described above, the security level can be increased further by incorporating a magnetic material into the device. This can be achieved in various ways. For example an additional layer may be provided (e.g. under the image element array 15) which may be formed of, or comprise, magnetic material. The whole layer could be magnetic or the magnetic material could be confined to certain areas, e.g. arranged in the form of a pattern or code, such as a barcode. The presence of the magnetic layer could be concealed from one or both sides, e.g. by providing one or more masking layer(s), which may be metal. If the focusing elements are provided by mirrors, a magnetic layer may be located under the mirrors rather than under the image array.

In still preferred cases the magnetic material can be further incorporated into the device by using it in the formation of the image array. For example, in any of the embodiments one or more of the sets of image slices (e.g. 16, 17 and/or 18) may be formed of a magnetic material, e.g. a magnetic ink. For instance, in the FIG. 17 embodiment, the dark portions of each image slice 16, 17 could be defined by magnetic material (e.g. printed in magnetic ink), on a background of a contrasting colour (or transparent), e.g. white. Alternatively, the image slices could be formed by applying a material defining the required parts of each image slice over a background formed of a layer of magnetic material, provided there is a visual contrast between the two materials. For example, in the FIG. 17 embodiment the light portions of each image slice 16, 17 could be formed by applying a suitable material, e.g. white ink, over a magnetic layer which is preferably dark in colour. This latter option of providing a magnetic background layer is advantageous since the magnetic material can be applied (e.g. printed) at a low resolution without affecting the operation of the device.

Security devices of the sort described above can be incorporated into or applied to any article for which an authenticity check is desirable. In particular, such devices may be applied to or incorporated into documents of value such as banknotes, passports, driving licences, cheques, identification cards etc.

The security device or article can be arranged either wholly on the surface of the base substrate of the security document, as in the case of a stripe or patch, or can be visible only partly on the surface of the document substrate, e.g. in the form of a windowed security thread. Security threads are now present in many of the world's currencies as well as vouchers, passports, travelers' cheques and other documents. In many cases the thread is provided in a partially embedded or windowed fashion where the thread appears to weave in and out of the paper and is visible in windows in one or both surfaces of the base substrate. One method for producing paper with so-called windowed threads can be found in EP-A-0059056. EP-A-0860298 and WO-A-03095188 describe different approaches for the embedding of wider partially exposed threads into a paper substrate. Wide threads, typically having a width of 2 to 6 mm, are particularly useful as the additional exposed thread surface area allows for better use of optically variable devices, such as that presently disclosed.

The security device or article may be subsequently incorporated into a paper or polymer base substrate so that it is viewable from both sides of the finished security substrate. Methods of incorporating security elements in such a manner are described in EP-A-1141480 and WO-A-03054297. In the method described in EP-A-1141480, one side of the security element is wholly exposed at one surface of the substrate in which it is partially embedded, and partially exposed in windows at the other surface of the substrate.

Base substrates suitable for making security substrates for security documents may be formed from any conventional materials, including paper and polymer. Techniques are known in the art for forming substantially transparent regions in each of these types of substrate. For example, WO-A-8300659 describes a polymer banknote formed from a transparent substrate comprising an opacifying coating on both sides of the substrate. The opacifying coating is omitted in localised regions on both sides of the substrate to form a transparent region. In this case the transparent substrate can be an integral part of the security device or a separate security device can be applied to the transparent substrate of the document. WO-A-0039391 describes a method of making a transparent region in a paper substrate. Other methods for forming transparent regions in paper substrates are described in EP-A-723501, EP-A-724519, WO-A-03054297 and ER-A-1398174.

The security device may also be applied to one side of a paper substrate so that portions are located in an aperture formed in the paper substrate. An example of a method of producing such an aperture can be found in WO-A-03054297. An alternative method of incorporating a security element which is visible in apertures in one side of a paper substrate and wholly exposed on the other side of the paper substrate can be found in WO-A-2000/39391.

Examples of such documents of value and techniques for incorporating a security device will now be described with reference to FIGS. 19 to 22.

FIG. 19 depicts an exemplary document of value 50, here in the form of a banknote. FIG. 19a shows the banknote in plan view whilst FIG. 19b shows the same banknote in cross-section along the line Q-Q'. In this case, the banknote is a polymer (or hybrid polymer/paper) banknote, having a transparent substrate 51. Two opacifying layers 52a and 52b are applied to either side of the transparent substrate 51, which may take the form of opacifying coatings such as white ink, or could be paper layers laminated to the substrate 51.

The opacifying layers 52a and 52b are omitted across an area 55 which forms a window within which the security device is located. As shown best in the cross-section of FIG. 19b, an array of focusing elements 56 is provided on one side of the transparent substrate 51, and a corresponding image element array 57 is provided on the opposite surface of the substrate. The focusing element array 56 and image element array 57 are each as described above with respect to any of the disclosed embodiments, such that at least two regions $R_1$ and $R_2$ are displayed, each displaying a respective image, at at least some viewing angles. When the document is viewed from the side of lens array 56, the aforementioned motion effect can be viewed upon tilting the device. In this case, the first direction (X axis) along which the focusing elements are aligned is parallel to the long edge of the document. This results in the first and second regions $R_1$, $R_2$ appearing to move left to right (or vice versa) within the window 55 as the document is tilted vertically (about the X axis). It should be noted that in modifications of this embodiment the window 55 could be a half-window with the opacifying layer 52b continuing across all or part of the window over the image element array 57. In this case, the window will not be transparent but may (or may not) still appear relatively translucent compared to its surroundings. The banknote may also comprise a series of windows or half-windows. In this case the different regions displayed by the security device could appear in different ones of the windows, at least at some viewing angles, and could move from one window to another upon tilting.

FIG. 20 shows such an example, although here the banknote 50 is a conventional paper-based banknote provided with a security article 60 in the form of a security thread, which is inserted during paper-making such that it is partially embedded into the paper so that portions of the paper 53 and 54 lie on either side of the thread. This can be done using the techniques described in EP0059056 where paper is not formed in the window regions during the paper making process thus exposing the security thread in is incorporated between layers 53 and 54 of the paper. The security thread 60 is exposed in window regions 65 of the banknote. Alternatively the window regions 65 which may for example be formed by abrading the surface of the paper in these regions after insertion of the thread. The security device is formed on the thread 60, which comprises a transparent substrate 63 with lens array 61 provided on one side and image element array 62 provided on the other. In the illustration, the lens array 61 is depicted as being discontinuous between each exposed region of the thread, although in practice typically this will not be the case and the security device will be formed continuously along the thread. In this example, the X axis (first direction) of the device is formed parallel to the short edge of the document 50 and the geometry is such that, at least at some viewing angles, different ones of the regions (displaying different images) will appear in each window 65. For example, a central window may display a first region $R_1$ (and hence the first image) whilst top and bottom windows may display second regions $R_2$, each displaying a second image. As the note is tilted about the X axis (i.e. horizontally, in this example, the regions $R_1$, $R_2$ appear to move vertically and may move from one window 65 to the next.

Alternatively several security devices could be arranged along the thread (e.g. so as to form a security device assembly as described above), with different or identical images displayed by each. In one example, a first window could contain a first device, and a second window could contain a second device, each having their focusing elements arranged along different (preferably orthogonal) directions, so that the two windows display different effects upon tilting in any one direction. For instance, the central window may be configured to exhibit a motion effect when the document 50 is tilted about the X axis whilst the devices in the top and bottom windows remain static, and vice versa when the document is tilted about the Y axis.

In FIG. 21, the banknote 50 is again a conventional paper-based banknote, provided with a strip element or insert 60. The strip 60 is based on a transparent substrate 63 and is inserted between two plies of paper 53 and 54. The security device is formed by a lens array 61 on one side of the strip substrate 63, and an image element array 62 on the other. The paper plies 53 and 54 are apertured across region 65 to reveal the security device, which in this case may be present across the whole of the strip 60 or could be localised within the aperture region 65. In this case, at least four images are incorporated into the device such that at least four corresponding regions $R_1$ to $R_4$ are displayed at at least some viewing angles. The focusing elements are arranged with their long direction along the X axis which here is parallel to the long edge of the note. Hence the regions $R_1$ to $R_4$ will appear to move left to right (or right to left) about tilting the note about the X-axis.

A further embodiment is shown in FIG. 22 where FIGS. 22(a) and (b) show the front and rear sides of the document respectively, and FIG. 22(c) is a cross section along line Z-Z'. Security article 60 is a strip or band comprising a security device according to any of the embodiments described above. The security article 60 is formed into a security document 50 comprising a fibrous substrate 53, using a method described in EP-A-1141480. The strip is incorporated into the security document such that it is fully exposed on one side of the document (FIG. 22(a)) and exposed in one or more windows 65 on the opposite side of the document (FIG. 22(b)). Again, the security device is formed on the strip 60, which comprises a transparent substrate 63 with a lens array 61 formed on one surface and image element array 62 formed on the other.

In FIG. 22, the document of value 50 is again a conventional paper-based banknote and again includes a strip element 60. In this case there is a single ply of paper. Alternatively a similar construction can be achieved by providing paper 53 with an aperture 65 and adhering the strip element 60 is adhered on to one side of the paper 53 across the aperture 65. The aperture may be formed during papermaking or after papermaking for example by die-cutting or laser cutting. Again, the security device is formed on the strip 60, which comprises a transparent substrate 63 with a lens array 61 formed on one surface and image element array 62 formed on the other.

In general, when applying a security article such as a strip or patch carrying the security device to a document, it is preferable to have the side of the device carrying the image element array bonded to the document substrate and not the lens side, since contact between lenses and an adhesive can render the lenses inoperative. However, the adhesive could be applied to the lens array as a pattern that the leaves an intended windowed zone of the lens array uncoated, with the strip or patch then being applied in register (in the machine direction of the substrate) so the uncoated lens region registers with the substrate hole or window It is also worth noting that since the device only exhibits the optical effect when viewed from one side, it is not especially advantageous to apply over a window region and indeed it could be applied over a non-windowed substrate. Similarly, in the context of a polymer substrate, the device is well-suited to arranging in half-window locations.

The invention claimed is:

1. A security device comprising:
    an array of elongate focusing structures, the elongate axes of which are aligned along a first direction, the elongate focusing structures being arranged parallel to one another periodically along a second direction which is orthogonal to the first direction, each elongate focusing structure having an optical footprint of which different elongate strips will be directed to the viewer in dependence on the viewing angle, the centre line of each optical footprint being parallel with the first direction; and
    an array of image elements overlapping the array of elongate focusing structures, the array of image elements representing elongate image slices of at least two respective images, each image slice comprising one or more image elements, and at least one image slice of each respective image being located in the optical footprint of each elongate focusing structure;
    wherein:
        the array of image elements is configured such that the distance in the second direction of each image slice from the centre line of an optical footprint in which the image slice is located changes along the first direction;
        at least at some viewing angles, the elongate strip of the optical footprint of each elongate focusing structure which is directed to the viewer includes a portion of a first image slice corresponding to a first image and a portion of a second image slice corresponding to a second image, such that the first image is displayed by a first region of the security device and the second image is displayed by a second region of the security device which is laterally offset from the first region in the first direction, the positions of the first and second regions along the first direction depending on the viewing angle; and
        a path of each image slice is curved or comprises multiple straight segments, an angle θ between the path and the first direction increasing or decreasing along the first direction.

2. A security device according to claim 1, wherein the path of each image slice is arranged makes a non-zero and non-orthogonal angle θ with the first direction.

3. A security device according to claim 2, wherein each image slice comprises a corresponding elongate image element extending along the path such that the distance of the image slice from the centre line of the optical footprint in which the image slice is located changes continuously along the first direction.

4. A security device according to claim 2, wherein each image slice comprises a set of at least two image elements positioned along the path such that the distance of the image slice from the centre line of the optical footprint in which the image slice is located changes discretely along the first direction.

5. A security device according to claim 4, wherein the array of image elements are arranged on a grid, the axes of the grid being non-parallel with the paths of the image slices.

6. A security device according to claim 5, wherein the axes of the grid are parallel to the first and second directions.

7. A security device according to claim 4, wherein the image elements are elongate in the first direction.

8. A security device according to claim 4, wherein the spacing in the first and second directions between each one of the set of image elements and the next one of the set of image elements is constant along the first direction.

9. A security device according to claim 4, wherein the spacing in the first and/or second directions between each one of the set of image elements and the next one of the set of image elements varies along the first direction.

10. A security device according to claim 2, wherein the angle θ between the path and the first direction is in the range 0.01 to 1 degree.

11. A security device according to claim 1, wherein each image slice crosses two or more of the optical footprints of the elongate focusing structures, such that, at at least some viewing angles, the elongate strip of the optical footprint of each elongate focusing structure which is directed to the viewer includes a portion of each of at least two first image slices corresponding to the first image and a portion of each of at least two second image slices corresponding to the second image, such that the first image is displayed by at least two first regions of the security device, spaced from one another, and the second image is displayed by at least two second regions of the security device which are laterally offset from the first regions in the first direction, the positions of the first and second regions along the first direction depending on the viewing angle.

12. A security device according to claim 1, wherein in a first part of the security device, the array of image elements is configured such that the distance in the second direction of each image slice from the centre line of the optical footprint in which the image slice is located increases along the first direction, and in a second part of the security device laterally offset from the first part, the array of image elements is configured such that the distance in the second direction of each image slice from the centre line of the optical footprint in which the image slice is located decreases along the first direction, such that upon tilting the regions displaying each respective image move in opposite directions along the first direction in the first and second parts of the device.

13. A security device according to claim 12, wherein the first and second parts of the device are laterally offset relative to one another along the first direction such that upon tilting the regions displaying each respective image in the first and second parts of the device move towards or away from one another.

14. A security device according to claim 12, wherein the first and second parts of the device are laterally offset relative to one another along the second direction such that upon tilting the regions displaying each respective image in the first and second parts of the device move past one another.

15. A security device according to claim 1, wherein each elongate focusing structure comprises an elongate focusing element.

16. A security device according to claim 1, wherein each elongate focusing structure comprises a plurality of focusing elements, arranged such that the centre point of each focusing element is aligned along a straight line in the first direction.

17. A security device according to claim 16, wherein the focusing elements are arranged in an orthogonal array or in a hexagonal array.

18. A security device according to claim 1, wherein the focusing structures comprise lenses or mirrors.

19. A security device according to claim 1, wherein the width of each elongate focussing structure in the second direction is in the range 5 to 200 microns.

20. A security device according to claim 1, wherein the image elements are defined by inks, at least some of the image elements being defined by magnetic inks.

21. A security device according to claim 1 wherein the image element array comprises a magnetic layer and applied image elements presenting a visual contrast against the magnetic layer.

22. A security device according to claim 1, wherein the image elements are defined by a relief structure.

23. A security device according to claim 22, wherein the relief structure comprises diffractive grating structures.

24. A security device according to claim 1, wherein the width of each image element is less than 50 microns.

25. A security device according to claim 1, wherein the array of image elements is located approximately in the focal plane of the elongate focusing structures.

26. A security device according to claim 1, wherein at least one of the first and second images is a uniform colour or is blank.

27. A security device according to claim 1, wherein at least one of the first and second images comprises one of a letter, number, symbol, character, logo, portrait or graphic.

28. A security device according to claim 1, further comprising a magnetic layer.

29. A security device assembly comprising at least two security devices each in accordance with claim 1, wherein the first direction along which the elongate focusing structures are aligned in each security device is different.

30. A security device according to claim 1, wherein the security device or security device assembly is formed as a security thread, strip, foil, insert, label or patch.

31. An article provided with a security device or security device assembly according to claim 1.

32. An article according to claim 31, wherein the article is selected from banknotes, cheques, passports, identity cards, certificates of authenticity, fiscal stamps and other documents for securing value or personal identity.

33. An article according to claim 31, wherein the article comprises a substrate with a transparent portion, on opposite sides of which the focusing elements and image elements respectively are provided.

34. A method of manufacturing a security device, the method comprising:
    providing an array of elongate focusing structures, the elongate axes of which are aligned along a first direction, the elongate focusing structures being arranged parallel to one another periodically along a second direction which is orthogonal to the first direction, each elongate focusing structure having an optical footprint of which different elongate strips will be directed to the viewer in dependence on the viewing angle, the centre line of each optical footprint being parallel with the first direction; and
    overlapping an array of image elements with the array of focusing elements, the array of image elements representing elongate image slices of at least two respective images, each image slice comprising one or more image elements, and at least one image slice of each respective image being located in the optical footprint of each elongate focusing structure;
    wherein:
        the array of image elements is configured such that the distance in the second direction of each image slice from the centre line of the optical footprint in which the image slice is located changes along the first direction;

at least at some viewing angles, the elongate strip of the optical footprint of each elongate focusing structure which is directed to the viewer includes a portion of a first image slice corresponding to a first image and a portion of a second image slice corresponding to a second image, such that the first image is displayed by a first region of the security device and the second image is displayed by a second region of the security device which is laterally offset from the first region in the first direction, the positions of the first and second regions along the first direction depending on the viewing angle; and a path of each image slice is curved or comprises multiple straight segments, an angle θ between the path and the first direction increasing or decreasing along the first direction.

35. A method according to claim 34 adapted to manufacture a security device according to a security device assembly wherein the first direction along which the elongate focusing structures are aligned in each security device is different.

\* \* \* \* \*